United States Patent
Dwarakanath et al.

(10) Patent No.: US 9,262,308 B2
(45) Date of Patent: Feb. 16, 2016

(54) TEST PATHS GENERATION FOR A PHYSICAL SYSTEM

(71) Applicant: Accenture Global Services Limited, Dublin (IE)

(72) Inventors: Anurag Dwarakanath, Bangalore (IN); Aruna Jankiti, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/516,259

(22) Filed: Oct. 16, 2014

(65) Prior Publication Data
US 2015/0205707 A1    Jul. 23, 2015

(30) Foreign Application Priority Data

Jan. 23, 2014 (IN) .............................. 284/CHE/2014
Aug. 27, 2014 (IN) .............................. 284/CHE/2014

(51) Int. Cl.
*G06F 11/36* (2006.01)
*G06F 11/34* (2006.01)

(52) U.S. Cl.
CPC ............ *G06F 11/3684* (2013.01); *G06F 11/34* (2013.01); *G06F 2201/86* (2013.01)

(58) Field of Classification Search
None
See application file for complete search history.

(56) References Cited

U.S. PATENT DOCUMENTS

| | | | | |
|---|---|---|---|---|
| 6,131,181 A | * | 10/2000 | Bushnell | G01R 31/3016 703/13 |
| 6,327,699 B1 | * | 12/2001 | Larus | G06F 11/3612 714/E11.209 |
| 6,804,634 B1 | | 10/2004 | Holzmann et al. | |
| 7,644,334 B2 | | 1/2010 | Hickman et al. | |
| 7,971,176 B2 | * | 6/2011 | Desineni | G01R 31/31835 702/120 |
| 8,543,944 B2 | | 9/2013 | Dwyer et al. | |
| 2009/0313600 A1 | * | 12/2009 | Ayers | G06F 8/456 717/106 |
| 2013/0318540 A1 | * | 11/2013 | Kumura | G06F 9/46 718/106 |

FOREIGN PATENT DOCUMENTS

AU    2013200136    8/2013
EP    0690395    1/1996

OTHER PUBLICATIONS

"Efficient Algorithms for Constructing Testing Sets, Covering Paths, and Minimum Flows" by Alfred V. Aho and David Lee, 1998, [retrieved from internet] retrieved on Mar. 2015.*
"Handling Irreducible Loops: Optimized Node Splitting versus DJ-Graphs" by Sebastian Unger and Frank Mueller, North Carolina State University. Jul. 2002, [retrieved from internet] retrieved on Mar. 2015.*

(Continued)

*Primary Examiner* — Chat Do
*Assistant Examiner* — Shirin Alizadeh
(74) *Attorney, Agent, or Firm* — Brinks Gilson & Lione

(57) ABSTRACT

A system generates a test path set in a very efficient manner. The test path set may be tailored to test a target physical system, such as a complex set of source code, a manufacturing line of multiple process nodes, or other physical system. The system may generate the test path set to meet certain goals in testing the target physical system, for example comprehensive testing of system paths, system nodes, or particular subsets. As one example, the system may efficiently generate a test path set that uses the minimum number of test paths to test a coverage goal, for example traversing each of the prime paths in the target physical system.

22 Claims, 13 Drawing Sheets

(56) References Cited

OTHER PUBLICATIONS

Aho, A. and Lee, D., 1987. Efficient algorithms for constructing testing sets, covering paths, and minimum flows. *AT&T Bell Laboratories Tech. Memo. CSTR159*, pp. 1-15.

Ammann, P. and Offutt, J. 2008. *Introduction to software testing.* Cambridge University Press. (346 pages).

Ammann, P., Offutt, J., Xu W. and Li, N., 2008. Coverage computation web applications. http://cs.gmu.edu:8080/offutt/coverage/GraphCoverage, last accessed Jan. 2014 (providing implementations of algorithms for generating prime paths). (1 page).

Ciurea, E. and Ciupalâ, L., 2004. Sequential and parallel algorithms for minimum flows. *Journal of Applied Mathematics and Computing*, 15(1), pp. 53-75.

Ford, L. R., & Fulkerson, D. R. (2010). *Flows in Networks.* Princeton University Press, *Chapter 1*, pp. 1-35. (40 pages).

Kaminski, G., Praphamontripong, U., Ammann, P. and Offutt, J., 2010. An Evaluation of the Minimal-MUMCUT Logic Criterion and Prime Path Coverage. *Software Engineering Research and Practice.* (7 pages).

Li, N., Li, F. and Offutt, J., 2012. Better Algorithms to Minimize the Cost of Test Paths. *Proceedings of the 5th IEEE International Conference on Software Testing, Verification and Validation—ICST 2012*, pp. 280-289.

Ntafos, S.C. and Hakimi, S.L., 1979. On Path Cover Problems in Digraphs and Applications to Program Testing. *IEEE Transactions on Software Engineering*, SE-5(5), pp. 520-529.

Patent Examination Report No. 1 from corresponding Australian patent application No. 2015200305 dated Mar. 12, 2015 (6 pages).

\* cited by examiner

TEST PATHS GENERATION FOR A PHYSICAL SYSTEM

PRIORITY CLAIM

This application claims priority to India provisional application serial number 284/CHE/2014, filed 23 Jan. 2014 in the India Patent Office, titled "Minimum Number of Test Paths for Prime Path Coverage," and the India non-provisional application also given serial number 284/CHE/2014, filed 27 Aug. 2014 in the India Patent Office, titled "Test Paths Generation For A Physical System", both of which are entirely incorporated by reference herein in their entirety.

TECHNICAL FIELD

This disclosure relates to testing, and also to generating a set of test paths for a physical system.

BACKGROUND

Rapid advances in technology have resulted in increasingly complex physical systems. In some instances, the physical systems implement software that can reach thousands to hundreds of thousands, and even millions of lines of code. Other physical systems often include multiple physical process nodes with complex interactions. These complex systems can include countless possible paths through which the system is traversed, such as paths through a manufacturing line or paths through a system implementing a complex software application. Manually generating tests to comprehensively test these systems may be laborious, cost multiple days of effort, or be completely infeasible in some cases.

DETAILED DESCRIPTION

Figure 1:
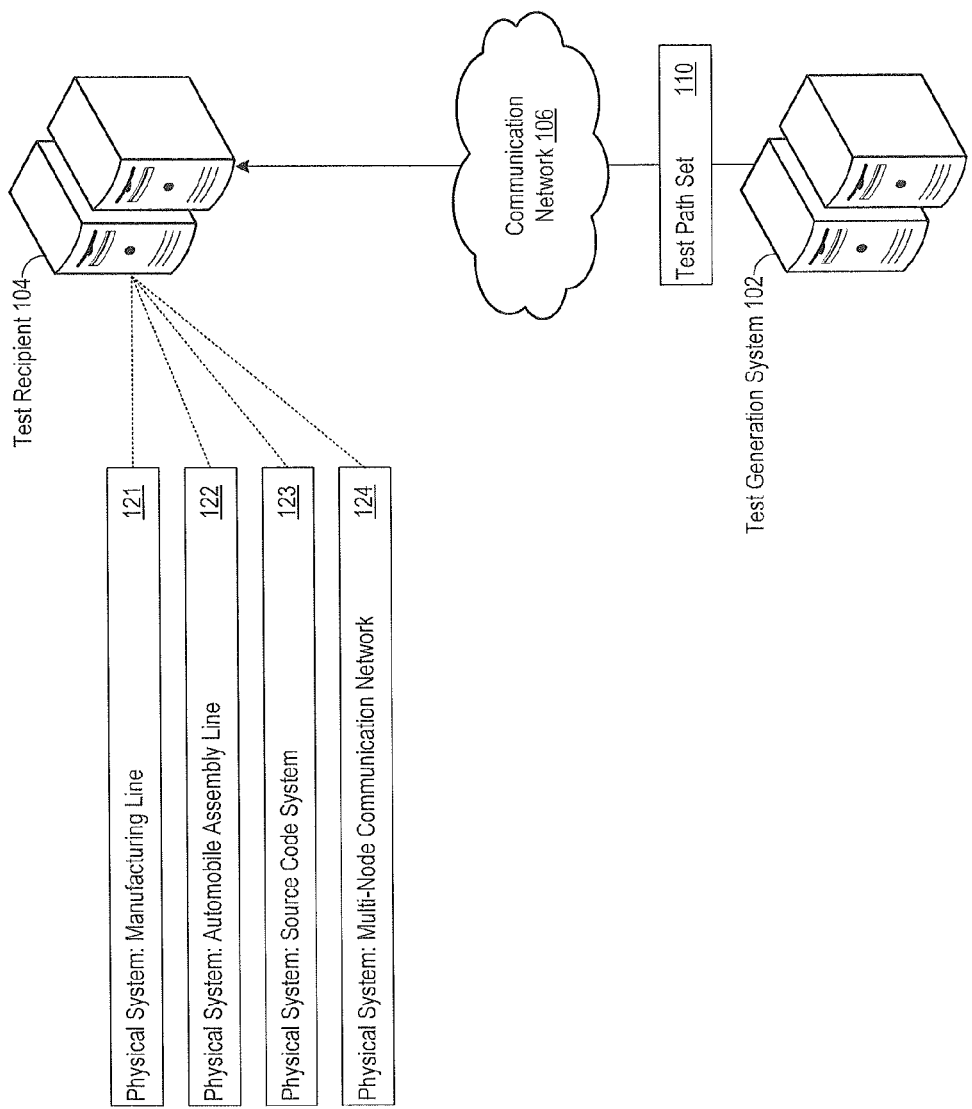
FIG. 1 shows an example of a system for generating test paths for a physical system.

FIG. 1 shows an example of a system 100 for generating test paths for a physical system. The system 100 includes a test generation system 102 in communication with a test recipient 104 through a communication network 106. As detailed below, the test generation system 102 may generate a test path set 110 that may indicate paths within a physical system to test. The physical system may be complex software code, physical process nodes, e.g., in an assembly line, or another physical system. In some variations, the test generation system 102 may generate the test path set 110 according to any number of path coverage criteria that the test path set 110 will satisfy when testing the physical system. For instance, the test generation system 102 may generate the test path set 110 to cover a specific set of elements in the physical system, such as a particular element, node, circuit, path, edge, communication link, or other sets or portions of the physical system. In one continuing example presented below, the test generation system 102 generates a test path set 110 that covers all of the prime paths in a physical system. The test generation system 102 may transmit the test path set 110 to the test recipient 104.

The test recipient 104 may test a physical system using the test path set 110. In that regard, the test recipient 104 may be communicatively linked to or be part of one or more physical systems. A physical system may refer to any system that includes multiple system elements, such as elements implemented as hardware, software, logic, machinery, devices, communication networks, sensors, nodes, code modules, and more. The elements in the physical system may be linked, e.g., communicatively, physically, along an assembly line, logically linked (e.g., through software function calls or flows), or in other ways. The links in the physical system may be specifically configured to achieve a desired functionality, and the physical system may operate according to particular physical processing flows specified by the links. In FIG. 1, the test recipient 104 is connected to four exemplary physical systems, including a manufacturing line 121, an automobile assembly line 122, a source code system 123, and a multi-node communication network 124. However, the number of forms a physical system may take is nearly limitless. Additional examples of physical systems the test generation system 102 may generate test paths for, the test recipient 104 may test for, or both, include traffic control systems, application servers, data warehouses, an industrial manufacturing facility, an office communication network, display circuitry in a mobile communication device, medical resonance imaging systems, and countless others.

Figure 2:
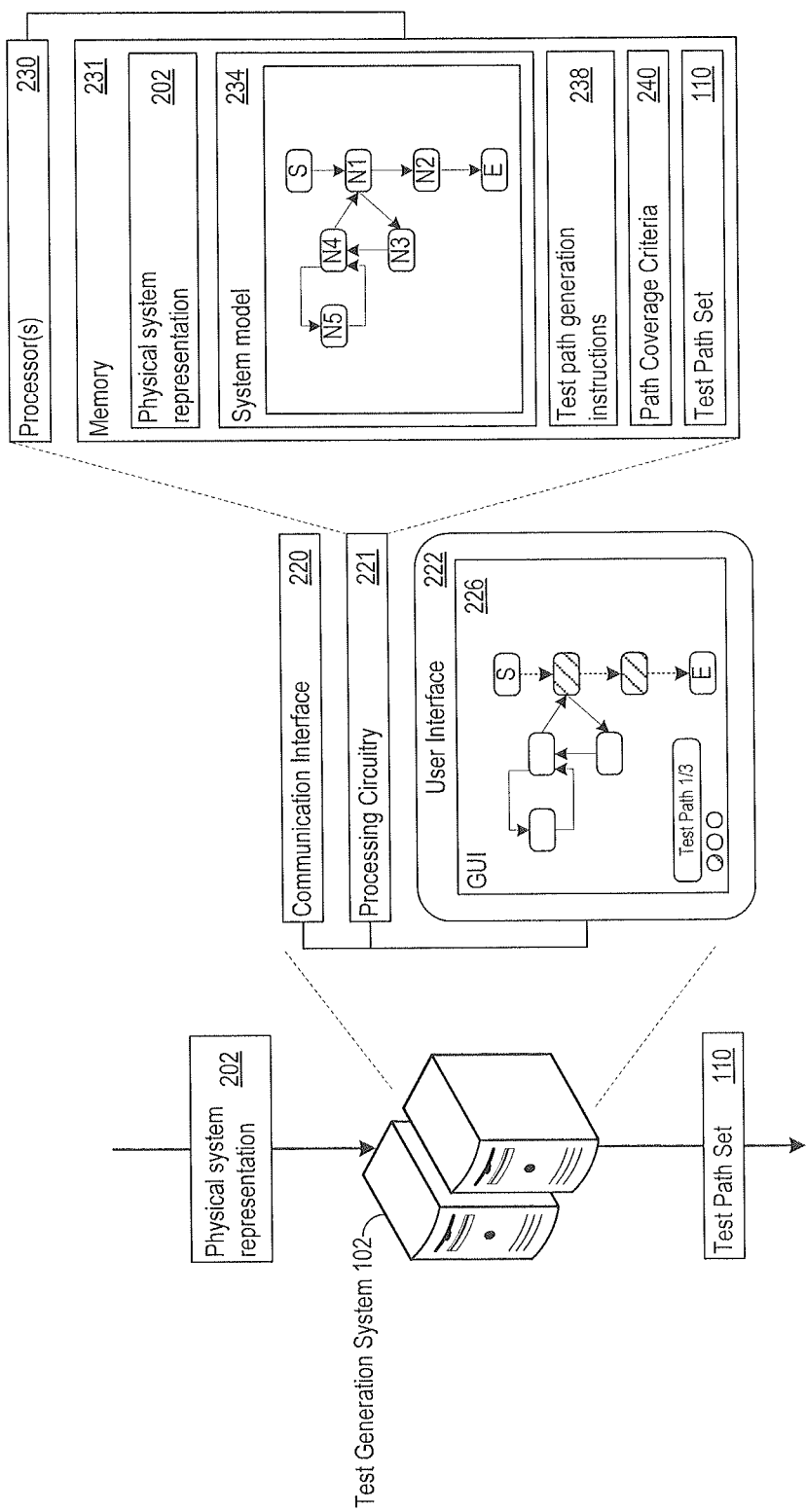
FIG. 2 shows an example of a test generation system.

FIG. 2 shows an example of a test generation system 102. The test generation system 102 may access a physical system representation 202, which may provide a representation of a particular physical system for which the test generation system 102 generates a test path set 110. The test path set 110 may include one or more source code, processing, communication, manufacturing line or other paths in the physical system. The test path set 110 may specify a particular physical processing flow or route to traverse in the physical system, e.g., such that the entirety or a particular subset of the physical system is accessed to ensure proper functionality of the physical system.

In FIG. 2, the test generation system 102 includes a communication interface 220, processing circuitry 221 and a user interface 222 which may include a graphical user interface 226. The communication interface 220 may include transceivers for wired or wireless communication. The communication interface 220 may support communication across any number of networks and according to any number of communication standards, protocols, methods, topologies, or configurations.

The processing circuitry 221 is part of the implementation of any desired functionality in the test generation system 102, such as any of the test path generation methods and techniques disclosed herein. In some implementations, the processing circuitry 221 includes one or more processors 230 and a memory 231. The memory 231 may store the physical system representation 202, a system model 234 of the physical system, test path generation instructions 238, path coverage criteria 240, and a generated test path set 110. The processor 230 may execute the test path generation instructions 238 to generate the test path set 110 according to the path coverage criteria 240.

The path coverage criteria 240 may specify various criteria that the test path set 110 should meet. One example of path coverage criteria 240 specifies that the test path set 110 will be the minimum number of paths that traverse each of the prime paths of a physical system representation. A prime path may refer to a simple path in the physical system that does not appear as a sub-path of any other simple path and a simple path may refer to a path that does not have repeating vertices (except possibly the starting and ending vertices). Additional examples of the path coverage criteria 240 may specify the test path set 110 include the minimum paths to (i) traverse all paths in the physical system with a length of at least two (e.g., where length is measured according to element-by-element traversal), (ii) meet simple and/or complete round trip coverage, (iii) cover particular links or path edges in the physical system, and (iv) cover particular nodes or elements in the physical system. A continuing example of path coverage criteria 240 for minimum path determination for prime path coverage is presented next.

Figure 3:
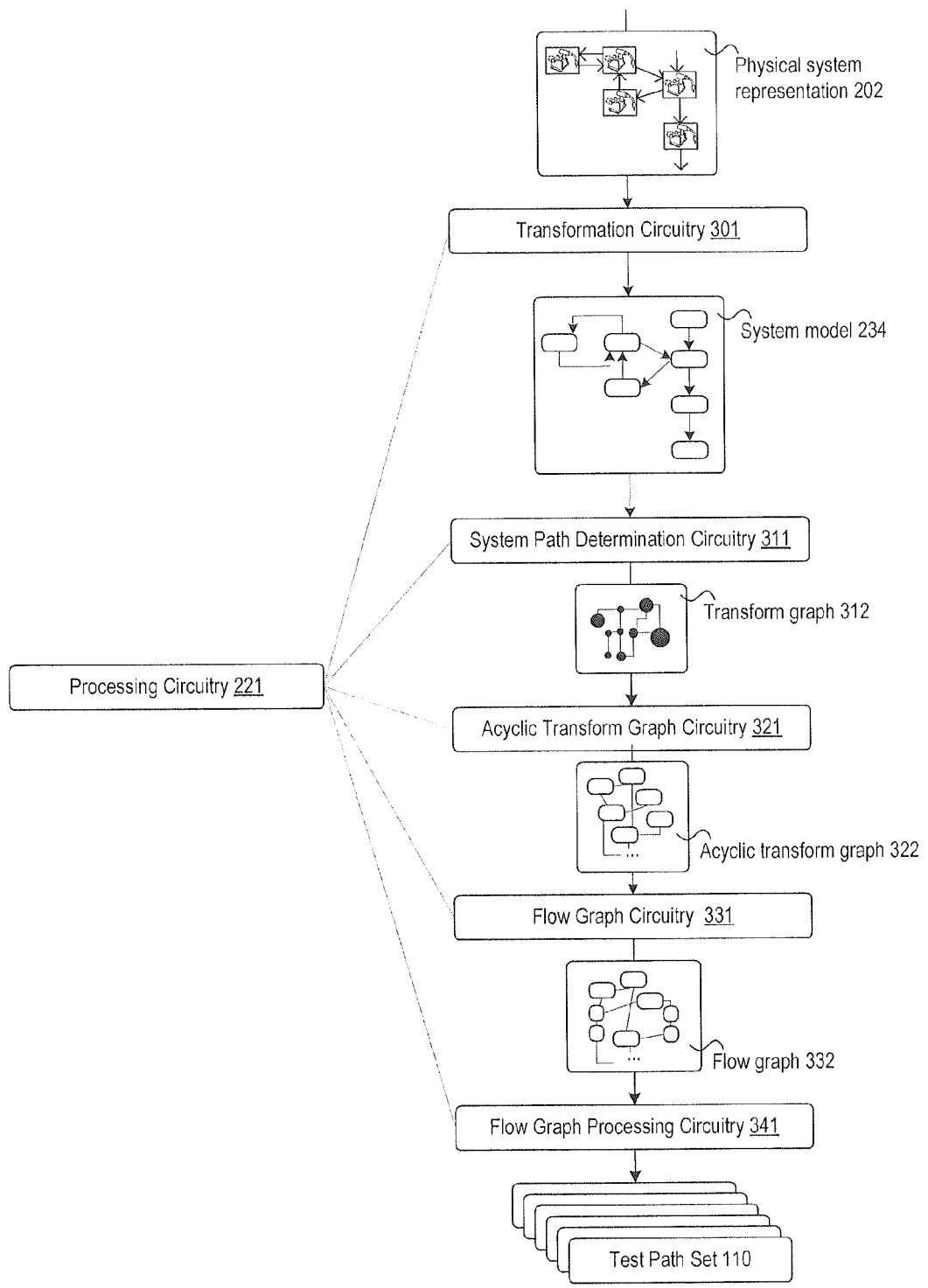
FIG. 3 shows an example of processing circuitry that the test generation system may implement.

FIG. 3 shows an example of processing circuitry 221 that the test generation system 102 may implement. The processing circuitry 221 may perform a series of processing steps to generate the test path set 110. In FIG. 3, the processing circuitry 221 includes transformation circuitry 301, system path determination circuitry 311, acyclic transform graph circuitry 321, flow graph circuitry 331, and flow graph processing circuitry 341.

The transformation circuitry 301 may transform a physical system representation 202 into a system model 234. The system model 234 may include vertices and edges that represent physical processing flow from a start vertex (also referred interchangeably as a node) to an end vertex through the physical system. The system path determination circuitry 311 may determine system paths from the system model 234, e.g., prime paths, and transform the system model 234 into a transform graph 312. The transform graph 312 may be one form of a transformed model including transformed flows that represent instances where the determined system paths connect to one another. The acyclic transform graph circuitry 321 may remove cycles from the transform graph 312 to generate an acyclic transform graph 322. The flow graph circuitry 331 may transform the acyclic transform graph 322 into a flow graph 332, which may include a flow model comprising model flows that separate incoming flows and outgoing flows to and from internal nodes. The flow graph processing circuitry 341 may select specific flow models within the flow model that provide a tour of each determined system path, and determine the test path set 110 from the specific model flows.

FIGS. 4-11, presented next, provide greater detail regarding the processing steps these circuitries 301, 311, 321, 331, and 341 may perform to generate the test path set 110. In particular, FIGS. 4-11 present logic that the processing circuitry 221 may implement to determine a test path set 110, e.g., with a minimum number of test paths for prime path coverage in the physical system. As noted previously, additional or alternative path coverage criteria 240 are possible as well.

Figure 4:
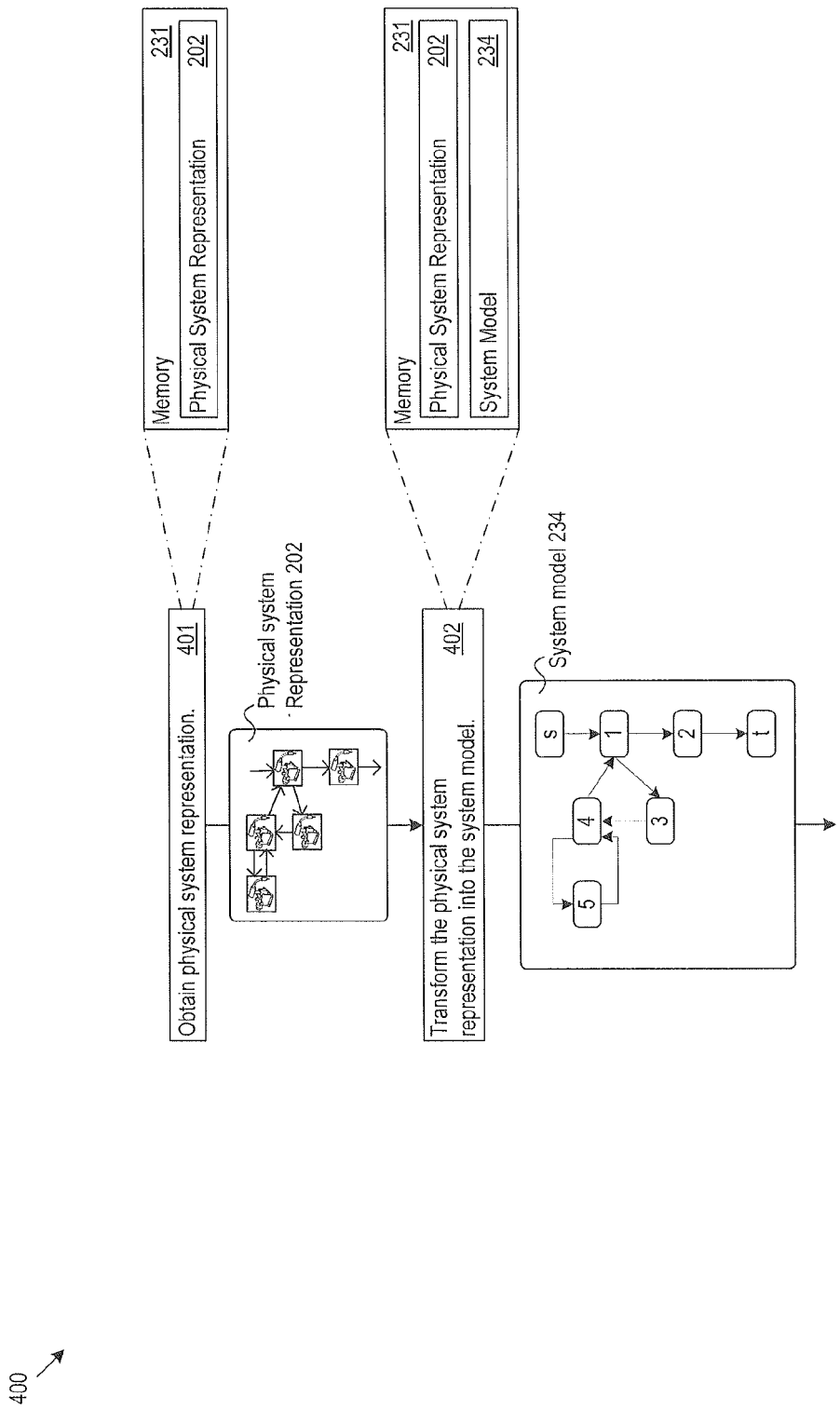
FIG. 4 illustrates exemplary logic that transformation circuitry may implement in hardware, software, or both.

FIG. 4 illustrates exemplary logic 400 that the transformation circuitry 301 may implement in hardware, software, or both. The transformation circuitry 301 may obtain a physical system representation 202 (401). The physical system representation 202 may represent a physical system in any number of data formats. For example, the physical system representation 202 may be a listing of system elements and links in the physical system, a schematic diagram, graph, mapping, or other layout of the physical system, or an image of the physical system. The transformation circuitry 301 may receive the physical system representation 202 from the physical system itself, a test recipient 104, or another source. The test generation system 102 may store the physical system representation 202 in a memory 231, from where the transformation circuitry 301 may access the physical system representation 202.

The transformation circuitry 301 may generate a system model 234 from the physical system representation 202, e.g., through transformation of the physical system representation 202 (402). The system model 234 generated by the transformation circuitry 301 may take the form of a graph that includes vertices representing system elements of the physical system, such as the vertices labeled 1-5 in the system model 234 shown in FIG. 4. The system model 234 may also include edges that represent links between system elements in the physical system, including the arrows linking the vertices as well as start and end vertices in the system model 234 in FIG. 4. In that regard, the system model 234 may also specify physical processing flows within the physical system, e.g., from a starting system element (e.g., starting vertex s) to an ending system element (e.g., ending vertex t). The system model 234 shown in FIG. 4 with starting node s, ending node t, and intermediate nodes labeled 1-5 is used as a continuing example for determining a minimum path set for prime path coverage. Put another way, the processing circuitry 221 may determine a test path set 110 for the particular system model 234 shown in FIG. 4, as shown through the continuing example below with regards to FIGS. 4-11.

Figure 5:
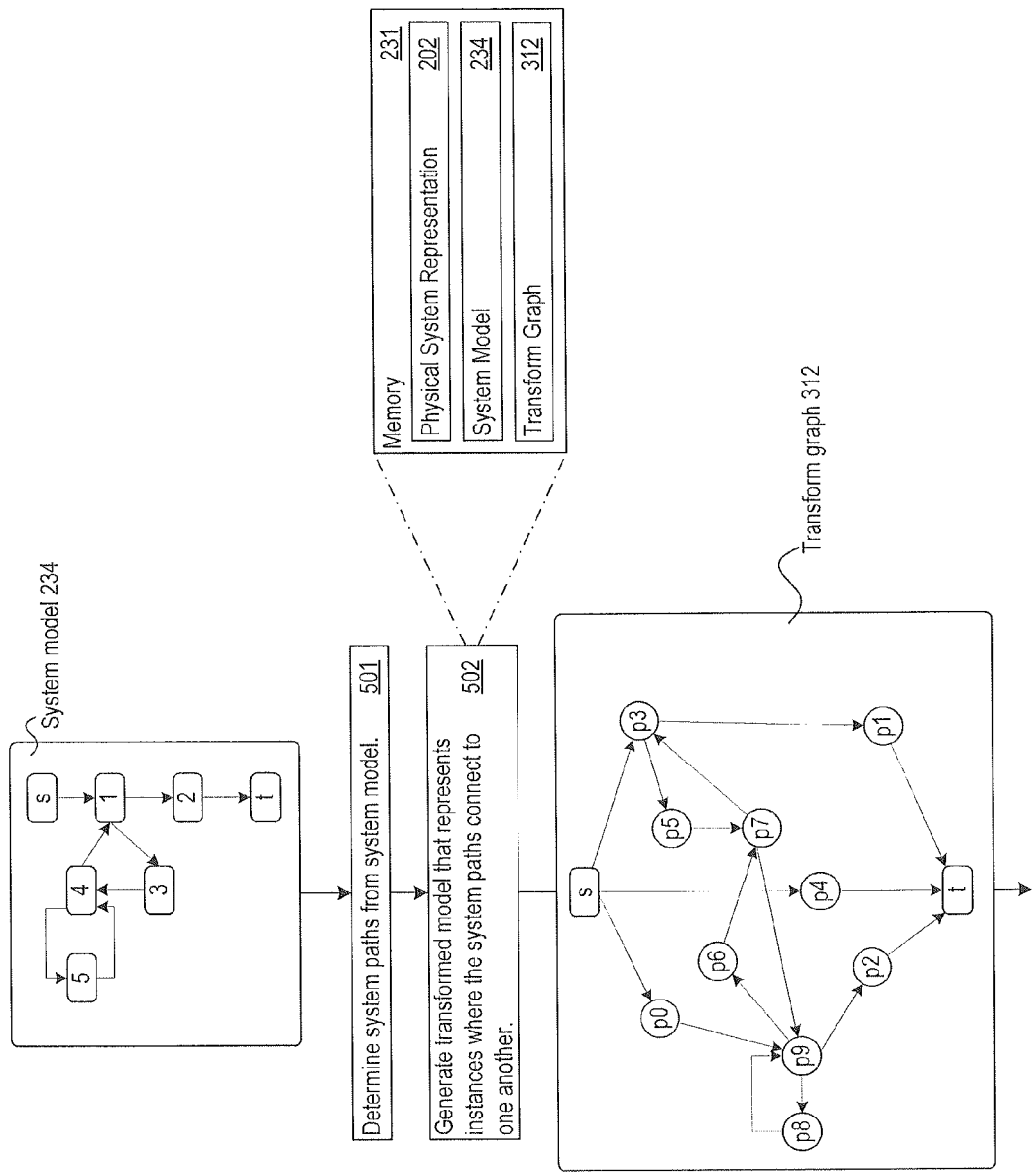
FIG. 5 illustrates exemplary logic that system path determination circuitry may implement in hardware, software, or both.

FIG. 5 illustrates exemplary logic 500 that the system path determination circuitry 311 may implement in hardware, software, or both. The system path determination circuitry 311 may determine system paths from the system model 234 (501). The particular system paths the system path determination circuitry 311 may determine from the system model 234 may vary depending on the path coverage criteria 240. For path coverage criteria 240 that specify a minimum number of test paths for prime path coverage, the system path determination circuitry 311 may determine the set of prime paths for the system model 234. However, the system path determination circuitry 311 may determine an aspect, portion, or subset of the system model 234 based on the path coverage criteria 240. For example, if the path coverage criteria 240 specifies coverage for paths of length 2 or greater, the system path determination circuitry 311 may determine the set of paths of length 2 or greater in the system model 234.

The system model 234 may take the form of a graph $G_1 = (V_1, E_1)$, where $V_1$ represents the vertex set of the system model 234 and $E_1$ represents the edge set of the system model 234. The vertex set $V_1$ may include starting vertex s and ending vertex t of the physical system. In one implementation, in determining the set of prime paths for the system model, 234, the system path determination circuitry 311 may perform the following logic:

Exemplary Logic 1: Computing Prime Paths For a System Model

Input : $G_1 = (V_1, E_1)$, with {starting vertex s, ending vertex t} $\in V_1$
Output: Set of Prime Paths, P = {$p_1, p_2 ... p_n$}.
1   Initialize P' = {$p_1, p_2 ... p_n$} = $E_1$, explorePath = true, lastSize = 0 .
2   while (explorePath)
3       explorePath = false; currentSize = |P'|
4       loop i from lastSize to currentSize
5           if $p_i$ is not a cycle
6               for every edge e E $\in E_1$
7                   if source vertex of e equals the last vertex of $p_i$
8                       if destination vertex of e is not already visited by $p_i$
                        except at start node of $p_i$
9                           explorePath = true
10                          P' = P' + $p_i$ +
                            destination vertex o f e
11                      end if
12                  end if
13              end for
14          end if
15      end loop
16      lastSize = currentSize; currentSize = |P'|
17  end while //P' has the set of simple paths
18  sort P' in ascending order of size
19  add last element of P' into P
20  loop i from (|P'| - 1) to 1
21      if $p_i$ is not a sub-path of any other path in P
22          add $p_i$ into P
23      end if
24  end loop
25  output P For the specific system model 234 shown in FIG. 4 with start vertex s, end vertex t, and intermediate vertices 1-5, the system path determination circuitry 311 may determine a prime path set P that includes 10 prime paths. In particular, the system path determination circuitry 311 may determine the prime path set P={$p_0$={s, 1, 3, 4, 5}, $p_1$={3, 4, 1, 2, t}, $p_2$={5, 4, 1, 2, t}, $p_3$={1, 3, 4, 1}, $p_4$={s, 1, 2, t}, $p_5$={3, 4, 1, 3}, $p_6$={5, 4, 1, 3}, $p_7$={4, 1, 3, 4}, $p_8$={5, 4, 5}, $p_9$={4, 5, 4} }.

The system path determination circuitry 311 may determine a lower bound on the minimum number of test paths for prime path coverage for the physical system. The lower bound may specify a minimum number of paths that the number of paths in the test path set 110 cannot be less than, though the processing circuitry 221 may generate a test path set 110 with greater number of paths than the lower bound. In determining the lower bound, the system path determination circuitry 311 may define multiple categories of prime paths. In particular, the system path determination circuitry 311 may define type S prime paths as those that visit the starting vertex s, type T prime paths as those that visit the ending vertex t, type C prime paths as cyclic prime paths (e.g., with an identical starting and ending vertex), and type P prime paths as simple paths that do not visit starting node s or ending node t and are not cyclic. For example prime path set P with 10 prime paths for the system model 234 shown in FIG. 4, the system path determination circuitry 311 may determine the following for the cardinalities for the defined prime path types: |Type S|=2, |Type T|=3, |Type C|=5, |Type P|=1.

The system path determination circuitry 311 may determine the lower bound on the minimum number of test paths for prime path coverage as max(|Type S|, |Type T|). In that regard, the system path determination circuitry 311 may determine the lower bound for the minimum number of test paths for the exemplary system model 234 in FIG. 4 as 3, which is the cardinality of |Type T|. The system path determination circuitry 311 may categorize the prime paths into defined types and determine the lower bound of the minimum number of test paths for prime path coverage in O(|P|) time complexity. To reach this efficient processing result, the system path determination circuitry 311 may categorize the paths by examining the first and last vertex of the prime paths in the prime path set P.

Upon determining the system paths, the system path determination circuitry 311 may generate a transformed model that represents instances where the system paths connect to one another (502). For instance, the system path determination circuitry 311 may generate a transform graph 312. The transform graph 312 may represent each of the determined system paths as vertices in the transform graph 312, and edges between vertices in the transform graph 312 may be placed by the system path determination circuitry 311 if a path in the system model 234 (e.g., as represented by a graph $G_1$) can tour the two system paths represented by the transform graph vertices. In one implementation, to generate the transform graph 312, the system path determination circuitry 311 may perform the following logic:

Exemplary Logic 2: Generating a Transform Graph

Input : $G_1$, P
Output: Transform Graph $G_2 = (V_2, E_2)$
1   create new vertex s, t in $V_2$
2   for every $p_i \in P$
3       create new vertex $v_i$ in $V_2$
4       Let $Path_s$ = Path in $G_1$ from s to first node of $p_i$.
5       $Path_s$ = $Path_s + p_i$
6       if $Path_s$ contains only the prime path $p_i$
7           add edge (s, $p_i$) into $E_2$
8       end if
9       Let $Path_t$ = ath in $G_1$ from the last node of $p_i$ to t.
10      $Path_t = p_i + ath_t$
11      if $Path_t$ contains only the prime path $p_i$
12          add edge ($p_i$, t) into $E_2$
13      end if
14  end for
15  for every $p_i \in P$
        if last node of $p_i$ doesn't contain t
16          for every $p_j \in P - p_i$
            if start node of $p_j$ doesn't contain s
17              if $p_i$ and $p_j$ do not have overlapping nodes
18                  $Path_{ij}$ = Path in $G_1$ from the last node of $p_i$ to the first node of $p_j$
19                  $Path_{ij} = p_i + Path_{ij} + p_j$
20              else
21                  $Path_{ij} = p_i \cup p_j$
22              end if
23              if $Path_{ij}$ contains only the prime paths $p_i$ and $p_j$
24                  add edge ($p_i$, $p_j$) into $E_2$
25              end if
26          end for
        end if
27  end for
28  output $G_2 = (V_2, E_2)$ Continuing the prime path example, the system path determination circuitry 311 may generate a transform graph 312 in which determined Prime Paths for a physical system and system model 234 are represented as respective vertices in the transform graph 312. The system path determination circuitry 311 inserts edges between two vertices in the transform graph 312 if a path in the system model 234 can tour the two Prime Paths represented by the vertices. Accordingly, the test generation system 100 may transform the coverage criteria of prime path coverage into a problem of node coverage (e.g., by identifying s-t paths such that all vertices of the transform graph 312 are covered). Since each vertex in the transform graph 312 corresponds to a Prime Path, the test generation system 100 may generate the test path set 110 by ensuring all vertices in the transform graph 312 (which correspond to prime paths in the system model 234) are covered.

For the particular system model 234 shown in FIG. 4 and prime path set P in the continuing example, the system path determination circuitry 311 may determine the following edges in the transform graph 312: $(p_0, p_9)$, $(p_9, p_2)$, $(p_4, t)$, $(p_5, p_7)$, $(p_9, p_8)$, $(p_3, p_5)$, $(p_1, t)$, $(s, p_4)$, $(s, p_0)$, $(p_2, t)$, $(p_7, p_3)$, $(p_9, p_6)$, $(p_6, p_7)$, $(p_8, p_9)$, $(s, p_3)$, $(p_3, p_1)$, and $(p_7, p_9)$. These edges are visualized in the particular transform graph 312 shown in FIG. 5. Accordingly, the system path determination circuitry 311 may generate a transformed model in the form of a transform graph 312.

Figure 6:
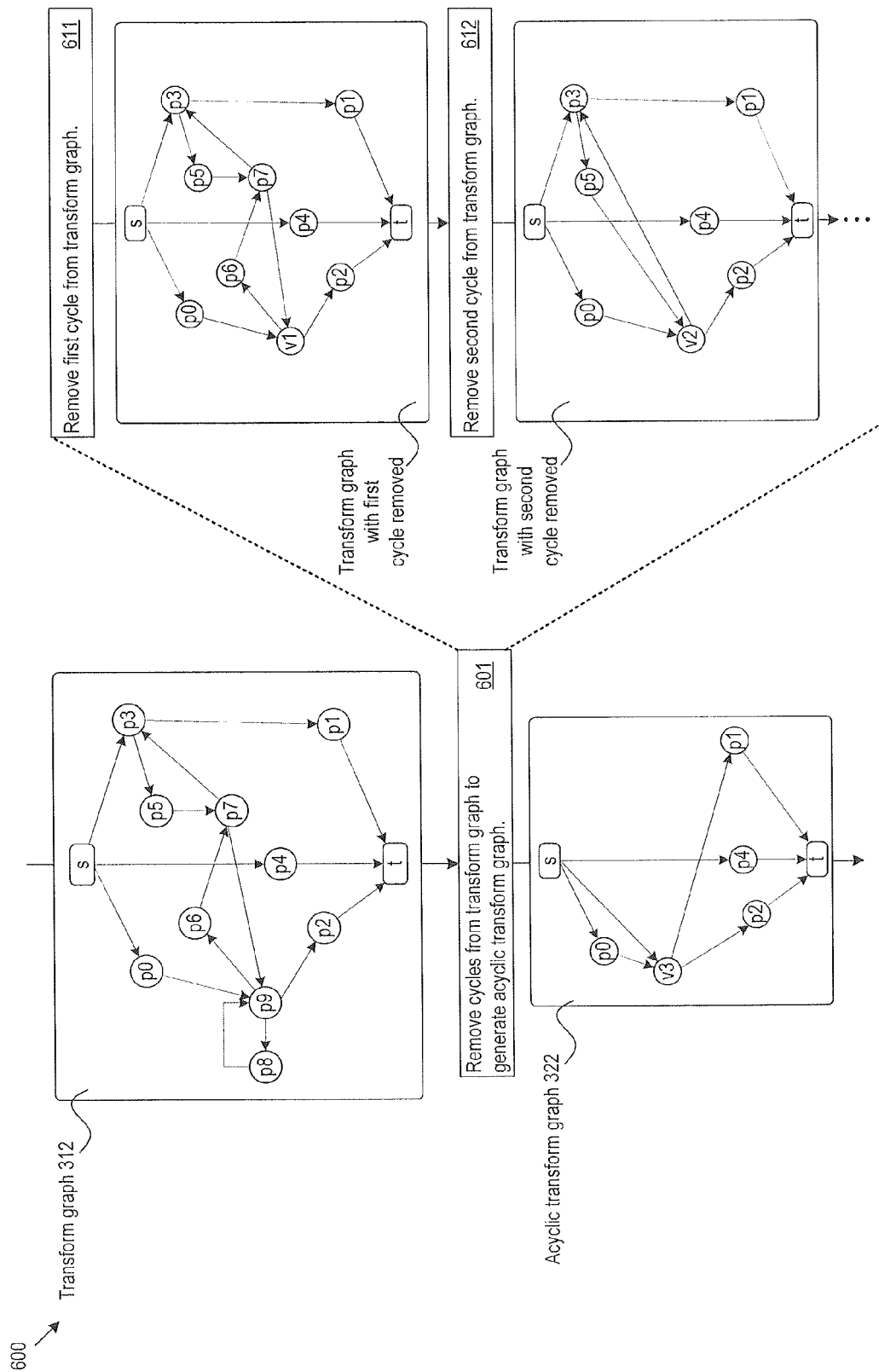
FIG. 6 illustrates exemplary logic that acyclic transform graph circuitry may implement in hardware, software, or both.

FIG. 6 illustrates exemplary logic 600 that the acyclic transform graph circuitry 321 may implement in hardware, software, or both. The acyclic transform graph circuitry 321 may determine whether the transform graph 312 includes cycles, and if so, remove the cycles to generate an acyclic transform graph 322 (601). Cycles may refer to as a cyclic path in a graph. In some implementations, the acyclic transform graph circuitry 321 removes cycles in the transform graph 312 by replacing cycles with a new vertex, where incoming edges of any vertex in the cycle become incoming edges of the new vertex. Similarly, any outgoing edges of any vertex in the cycle become outgoing edges of the new vertex. In some implementations, the acyclic transform graph circuitry 321 may perform the following exemplary logic to identify and remove cycles from the transform graph 312:

---

Exemplary Logic 3: RemovingCycles in a Transform Graph

Input : $G_2$
Output: Acyclic Transform Graph $G_3 = (V_3, E_3)$
1  initialize $V_3 = V_2$, $E_3 = E_2$, $G_3 = (V_3, E_3)$
2  while (true)
3    find all Prime Paths, , of $G_3$//e.g., using exemplary logic 1 above.
4    if there are no cycles //e.g., No prime paths of Type C in $G_2$
5      Break
6    end if
7    let $p_c = \{v_1, v_2, ..., v_n, v_1\} \in P$ be any Prime Path of Type C
8    remove vertices $\{v_1, v_2, ..., v_n\}$ from $V_3$
9    record vertices $v_i \in V_3$ which have an edge in $E_3$ with vertices in $p_c$.
10   create new vertex $v_{new}$ in $V_3$.
11   for every vertex $v_i \in p_c$
12     if $v_i$ has an incoming edge from vertex $v_k$ in $G_2$ where $v_k \in V_3 - p_c$
13       remove edge $(v_k, v_i)$ from $E_3$
14       create edge $(v_k, v_{new})$ in $E_3$
15     end if
16     if $v_i$ has an outgoing edge to vertex $v_k$ in $G_2$ where $v_k \in V_3 - p_c$
17       remove edge $(v_i, v_k)$ from $E_3$
18       create edge $(v_{new}, v_k)$ in $E_3$
19     end if
20   end for
21 end while
22 output $G_3 = (V_3, E_3)$

---

In the exemplary logic above, the acyclic transform graph circuitry 321 may determine the prime paths for traversing the transform graph 312. For example, the acyclic transform graph circuitry 321 may perform the exemplary logic 1 above for computing the prime paths of a graph, with the transform graph 312 as an input. The acyclic transform graph circuitry 321 may identify cycles in the transform graph 312 by identifying a type C prime path in the transform graph 312, e.g., a prime path in the transform graph 312 whose starting vertex and ending vertex are identical. If there are no type C prime paths in the transform graph 312 and accordingly no cycles, the acyclic transform graph circuitry 321 may determine that the transform graph 312 is already in acyclic form.

When the acyclic transform graph circuitry 321 identifies one or more type C prime paths in the transform graph 312, the acyclic transform graph circuitry 321 may select one of the type C prime paths and replace the cycle represented by the type C prime path with a new vertex. Then, the acyclic transform graph circuitry 321 may again determine the prime paths in the transform graph 312 (now with a new vertex replacing a previous type C prime path) and replace a type C prime path until no cycles remain. In that regard, the acyclic transform graph circuitry 321 may sequentially remove cycles from the transform graph 312 until no cycles remain.

One illustration of sequential cycle removal is provided in FIG. 6. Specifically, the acyclic transform graph circuitry 321 may identify and remove a first cycle from the transform graph 312 (611). With regards to the continuing prime path example and the specific transform graph 312 shown in FIGS. 5 and 6, the acyclic transform graph circuitry 321 may identify, as the first cycle, the cyclic path $\{p_9, p_8, p_9\}$ and replace this cyclic path with the new vertex $v_1$. The resulting intermediate transform graph with a first cycle removed is shown in FIG. 6 below step 611. In replacing the cyclic path in transform graph 312 with a new vertex, the acyclic transform graph circuitry 321 may store connection information for the replaced cyclic path. The connection information may include incoming edge data for the vertices in the cyclic path replaced by the new vertex. For the first cyclic path $\{p_9, p_8, p_9\}$, the acyclic transform graph circuitry 321 may identify and store the incoming edges for vertex $p_9$ (which has incoming edges from $p_0$, $p_7$, and $p_8$) and vertex $p_8$ (which has an incoming edge from $p_9$). The processing circuitry 221 may later use this incoming edge data for removed cycles for determining the test path set 110.

Continuing the sequential cycle removing process, the acyclic transform graph circuitry 321 may identify and remove a second cycle (612) from the intermediate graph resulting from removing the first cycle. The acyclic transform graph circuitry 321 may identify, as a second cycle, the cyclic path $\{p_6, p_7, v_1, p_6\}$ and replace this second cyclic path with a new vertex $v_2$ (which includes the first new vertex $v_1$). The resulting intermediate transform graph with a first and second cycle removed is shown in FIG. 6 below step 612. For incoming edge data for vertices in the second removed cyclic path, the acyclic transform graph circuitry 321 may store connection information that includes the incoming edge data for vertex $p_6$ (which has an incoming edge from $v_1$), $p_7$ (which has an incoming edge from vertices $p_5$ and $p_6$), and $v_1$ (which has incoming edges from $p_9$ and $p_7$).

The acyclic transform graph circuitry 321 may continue to remove cycles to generate the acyclic transform graph 322. In the continuing example, the acyclic transform graph circuitry 321 may next remove the cyclic path $\{v_2, p_3, p_5, v_2\}$ and replace this cyclic path with a new vertex $v_3$. Then, the acyclic transform graph circuitry 321 may determine that all cycles have been removed from the transform graph 312. As the cycles are removed from the transform graph 312, the acyclic transform graph circuitry 321 may track and store the replaced cyclic paths respectively corresponding to newly inserted vertexes for later processing.

The particular acyclic transform graph 322 shown in FIG. 6 may result when the acyclic transform graph circuitry 321 completes the cycle removing process. As seen in FIG. 6, the resulting exemplary acyclic transform graph 322 includes the vertices $p_0, p_1, p_2, p_4$, and $v_3$. The acyclic transform graph 322 generated by the acyclic transform graph circuitry 321 may be directed in that the edges linking vertices in the acyclic transform graph 322 are directional.

Figure 7:
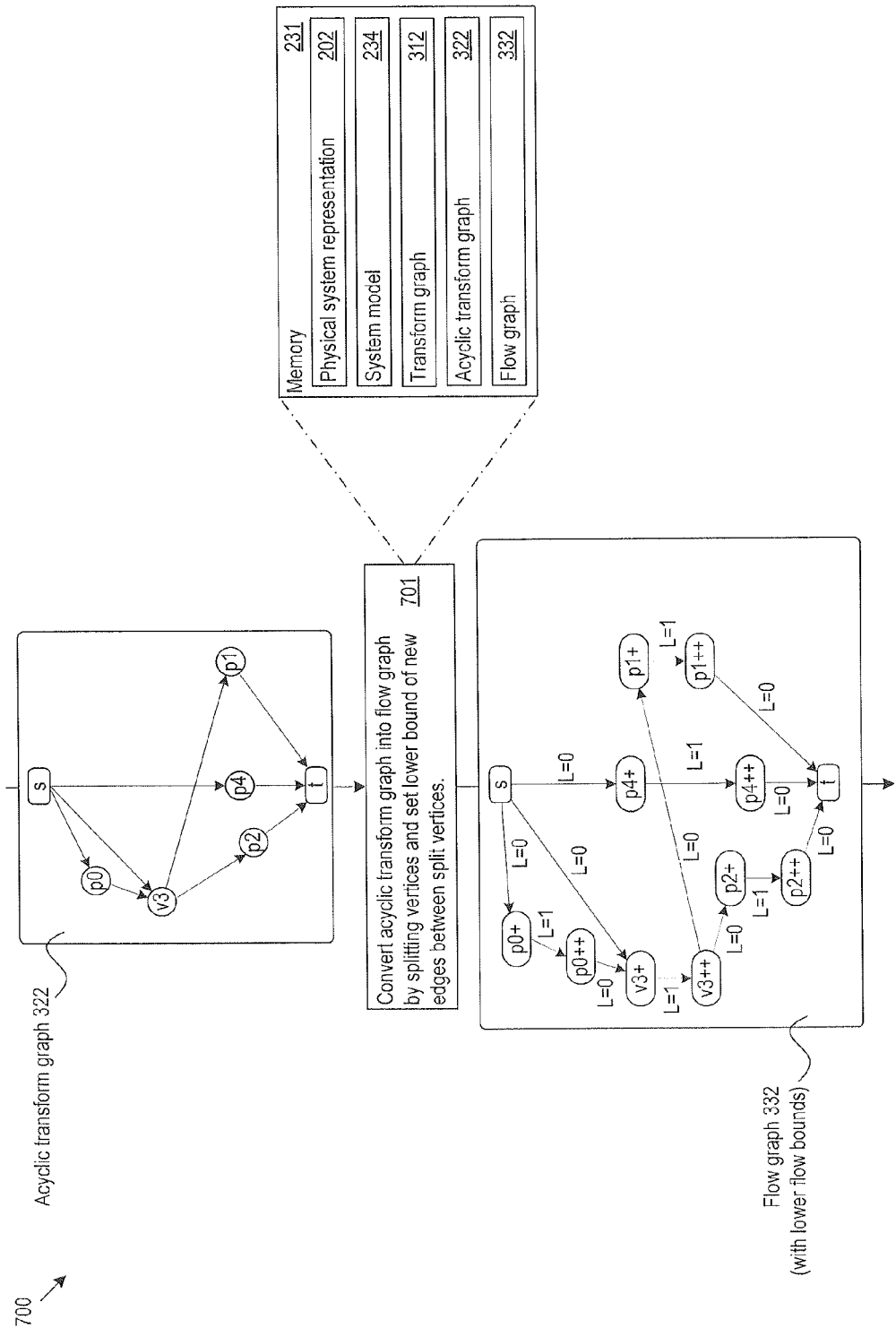
FIG. 7 illustrates exemplary logic that flow graph circuitry may implement in hardware, software, or both.

FIG. 7 illustrates exemplary logic 700 that the flow graph circuitry 331 may implement in hardware, software, or both. The flow graph circuitry 331 may implement or perform the logic 700 to convert the acyclic transform graph 322 into a flow graph 332. To generate the flow graph 332, the flow graph circuitry 331 may split internal vertices in the acyclic transform graph 322 and assign flow bounds to edges in the flow graph 332 (701). For reference, the acyclic transform graph 322 may be referred to as $G_3$ and include a set of vertices $V_3$ and edges $E_3$. The flow graph circuitry 331 may split a vertex $v_i \in V_3 - \{s, t\}$ into two vertices $v_i^+$, $v_i^{++}$ and represent the new vertex set as $V_4$. New edges $(v_i^+, v_i^{++})$ may also be added by the flow graph circuitry 331, and the flow graph circuitry 331 may make the incoming edges of $v_i$ into incoming edges of $v_i^+$ and the outgoing edges of $v_i$ into outgoing edges of $v_i^{++}$. The flow graph circuitry 331 may represent the new edge set as $E_4$.

The flow graph circuitry 331 may identify flows in the flow graph 332, which may refer to a path from the starting vertex s to ending vertex t in the flow graph 332. The flow graph circuitry 331 may map a flow in the flow graph 332 to a path in the system model 234 that traverses from the starting node s to the ending node t. In that regard, any flow requirements (e.g., conditions a flow must satisfy) that are assigned to flows in the flow graph 332 may impose corresponding requirements on the system model 234 of the physical system.

The flow graph circuitry 331 may determine flow requirements for flows in the flow graph 332. As examples of flow requirements, the flow graph circuitry 331 may determine flow bounds for edges in the flow graph 332 that specify a minimum or maximum number of flows required to traverse a particular edge. For example, the flow graph circuitry 331 may determine a lower bound $l_{ij}$ by applying the following lower flow bound equation to assign lower flow bounds for edges in the flow graph 332:

$$l_{ij} = \begin{cases} 1 & \text{if } (i, j) = (v_i^+, v_i^{++}) \\ 0 & \text{otherwise} \end{cases}$$

The lower flow bound may represent a minimum number of flows that traverse across a particular edge in the graph. Accordingly, by setting a minimum flow bound of 1, the flow graph circuitry 331 may ensure that at least one flow traverses a particular edge. Explained further, when the flow graph circuitry 331 splits a particular vertex into two new vertices and assigns a lower flow bound of greater than 0 to the new edge linking the two new vertices, the flow graph circuitry 331 may ensure the previously split vertex is traversed by at least one flow. The flow graph circuitry 331 may also determine an upper flow bound (also referred to as an edge capacity) $c_{ij}$ for edges in the flow graph 332. In one implementation, the flow graph circuitry 331 determines edge capacities according to the following equation:

$$c_{ij} = \frac{|V_4|}{2} - 1$$

Accordingly, the flow graph circuitry 331 may generate a flow graph 332 through splitting of internal nodes in the acyclic transform graph 322 and assign a respective lower flow bound and edge capacity for edges in the flow graph 332. The particular flow graph 332 shown in FIG. 7 may be generated by the flow graph circuitry 331 for the particular acyclic transform graph 322, which also depicts lower flow bounds determined by the flow graph circuitry 331 for edges of the flow graph 332. As seen in the particular flow graph 332 shown in FIG. 7, the edges linking new vertices (e.g., p0+ and p0++ as well as v3+ and v3++ as just two examples) are assigned a lower flow bound of 1 by the flow graph circuitry 331 while other edges are assigned a lower flow bound of 0.

For reference, the flow graph 332 generated by the flow graph circuitry 331 may be referred to as $G_4 = (V_4, E_4, L, C)$, where L is the set of lower flow bounds and C is the set of edge capacities.

The flow requirements assigned by the flow graph circuitry 331 may ensure that edges linking split vertices are chosen by at least one flow in the flow graph 332. As split vertex pairs correspond to non-split vertex in $G_3$ and $v_i \in V_3 - \{s, t\}$ (e.g., the vertices in the acyclic transform graph 322), a set of flows that meet the flow requirements assigned by the flow graph circuitry 331 will ensure each vertex of $G_3$ is covered. By expanding vertexes placed in lieu of cycles in $G_3$, the flow graph circuitry 331 may accordingly ensure each vertex of $G_2$ is covered, which in turn may ensure satisfaction of the path coverage criteria 240, e.g., that every Prime Path of $G_1$ (the system model 234) is toured.

Figure 8:
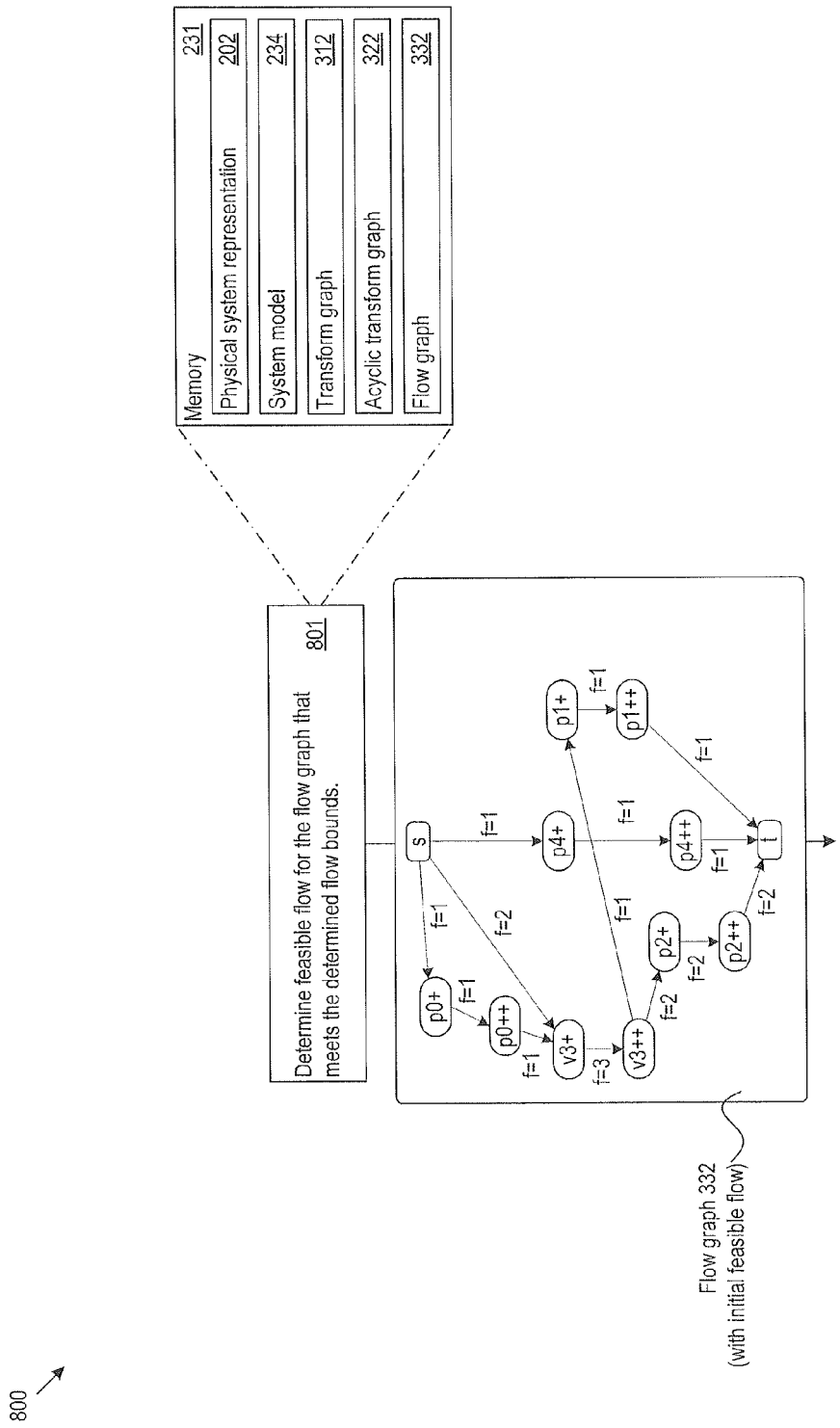
FIG. 8 shows another example of logic that the flow graph circuitry may implement in hardware, software, or both.

Upon assigning flow requirements to the flow graph 332, the flow graph circuitry 331 may determine a set of feasible flows that satisfies the flow requirements of the flow graph 332. This may include determining a number of flows that traverse through the edges in the flow graph 332. FIG. 8 illustrates exemplary logic 800 that the flow graph circuitry 331 may implement in hardware, software, or both. The flow graph circuitry 331 may implement or perform the logic 800 to process the flow graph 332 by determining an initial flow that meets the requirements (e.g., flow bounds) of the flow graph 332, e.g., an initial feasible flow. In particular, the flow graph circuitry 331 may determine a feasible flow for the flow graph 332 that meets the determined flow bounds (801), where a feasible flow may include assigning of a non-negative value, $f_{ij}$ for edges in the flow graph 332 such that the following flow conditions hold:

$$f_{ij} \geq l_{ij} \ \& \ f_{ij} \leq c_{ij}, \ \forall \ (i, j) \in E_4 \ \& \ i, j \in V_4 \quad (1)$$

$$\sum_i f_{ij} = \sum_j f_{ji}, \ \forall \ (i, j) \in E_4 \ \& \ i, j \in V_4 - \{s, t\} \quad (2)$$

In some implementations, the flow graph circuitry 331 may perform the following exemplary logic to determine an initial feasible flow for the flow graph 332:

---
Exemplary Logic 4. Initialization of a feasible flow

Input: $G_4 = (V_4, E_4, L, C)$
Output: feasible flow $f_{ij}$, $\forall$ (i,j) $\in E_4$ & i,j $\in V_4$
1   initialize $f_{ij} = 0$, $\forall$ (i,j) $\in E_4$ & i,j $\in V_4$
2   for every vertex i $\in V_4 - \{s, t\}$ do
3     find path, $p_s$, from s to i using breadth-first-search
4     find path, $p_t$, from i to t using breadth-first-search
5     path, $p = p_s + p_t$
6     $k = \min\{(f_{mn} - l_{mn}), \forall (m, n) \in p\}$
7     if k < 0 then
8       for every edge (m, n) $\in$ p
9         $f_{mn}$ += 1
10      end for
11    end if
12  end for
---

The breadth-first search complexity may have a complexity of $O(|E|)$ and the complexity of steps 6 and 8-10 above may have a complexity of $O(|E|)$ each. Accordingly, the flow graph circuitry 331 may perform the exemplary logic 4 in $O(|E_4||V_4|)$ time.

The flow graph circuitry 331 may ensure that flow conditions (1) and (2) above are met when initializing the feasible flow, including through performing exemplary logic 4 above.

The exemplary logic 4 above may also satisfy the flow requirements specified by the flow graph circuitry 331, including satisfying the determined lower flow bounds and edge capacities. To explain, consider a vertex i in $G_3$, the acyclic transform graph 322. The flow graph circuitry 331 processes (e.g., splits) this vertex and is thus represented as $i^+$ and $i^{++}$ in $G_4$, the flow graph 332. A path from starting node s to $i^{++}$ will cover the edge $(i^+, i^{++})$ since $i^{++}$ is reachable only through $i^+$. Thus, by incrementing the flow along the path from starting node s to $i^{++}$, the flow graph circuitry 331 will ensure that the flow condition of $l_{ij}=1$ for $(i,j)=(i^+, i^{++})$ is met. Through checking $\forall i \in V_4$, the flow graph circuitry 331 may ensure flow condition (1) is satisfied for all edges. The flow graph circuitry 331 may perform increments of the flow for every edge of a path from starting node s to ending node t.

To further illustrate, consider the vertex $i^+$ in $G_4$, the flow graph 332. The flow graph circuitry 331 may identify m incoming edges into the vertex $i^+$. Since the flow graph circuitry 331 creates i+ by splitting vertex i, $i^+$ will have one outgoing edge, i.e., to $i^{++}$. The flow graph circuitry 331 may determine that vertex $i^+$ is part of an s–t path n number of times, where $$1 \le n \le \frac{|V_4|}{2} - 1.$$

The flow graph circuitry 331 may determine that the m incoming edges to i+ will be visited number of times, with each visit incrementing the flow by 1 (e.g., when initializing the feasible flow). Thus, the sum of flows on the incoming edges will be n. Similarly, the flow graph circuitry 331 may determine the outgoing edge will be visited n times and will also have a flow of n. Thus, by incrementing the flow of every edge of an s–t path, the flow graph circuitry 331 ensures flow condition (2) is met.

As one example, the flow graph circuitry 331 may determine an initial feasible flow for the particular flow graph 332 in FIG. 7 with lower flow bounds assigned. The flow graph circuitry 331 may perform exemplary logic 4 and generate the flow graph 332 shown in FIG. 8 with an initial feasible flow specified by the flow values specified for the edges in the flow graph 332. In particular, the flow graph circuitry 331 may initialize the flows in the flow graph 332 in the following order: first by initializing $p_4$++, followed by $p_2$++, $p_1$++, and $p_0$++. The flow graph circuitry 331 may determine the total flow of the particular flow graph 332 shown in FIG. 8 as 4.

Figure 9:
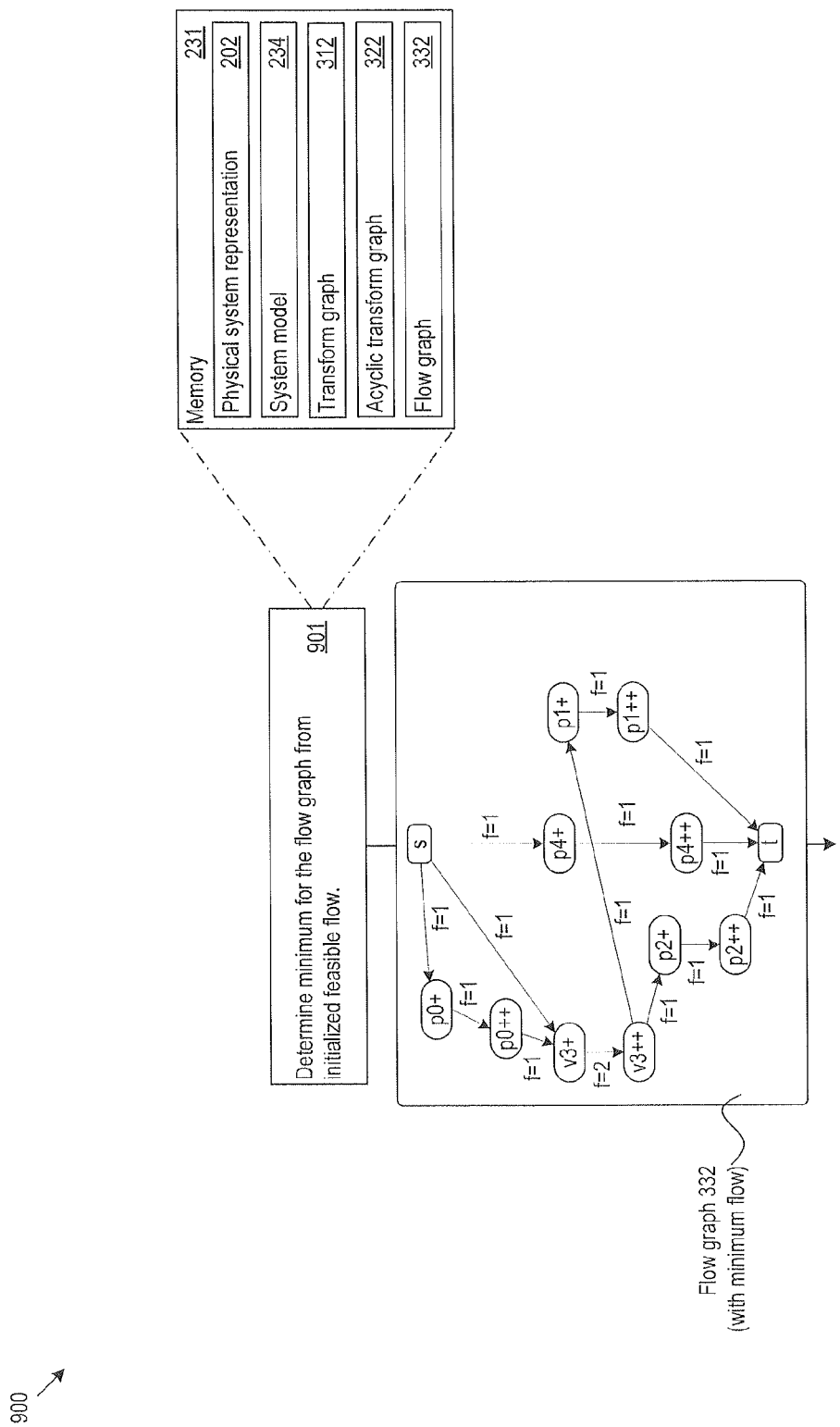
FIG. 9 shows another example of logic that flow graph circuitry may implement in hardware, software, or both.

After determining an initial feasible flow for the flow graph 332, the flow graph circuitry 331 may further process the flow graph 332 to determine a minimum flow for the flow graph 332. FIG. 9 shows exemplary logic 900 that the flow graph circuitry 331 may implement in hardware, software, or both. The flow graph circuitry 331 determines a minimum flow for the flow graph 332 from the initialized feasible flow (901). In particular, the flow graph circuitry 331 may determine the minimum flow, $f_{min}$, as the least amount of feasible flow possible in the network.

In some implementations, the flow graph circuitry 331 utilizes decreasing path logic to determine the minimum flow from the flow graph 332 initialized with a feasible flow. In doing so, the flow graph circuitry 331 may identify the edges in the flow graph 332 with an initialized feasible flow as forward edges, and this set of forward edges may be referred to as $E_4^f$. For the forward edges, the flow graph circuitry 331 may respectively introduce a new backward edge. To illustrate, for a forward edge of the form (i, j), the flow graph circuitry 331 may insert a backward edge of the form (j, i). For reference, let this set of backward edges be called $E_4^b$. For each backward edge, the flow graph circuitry 331 may set the lower flow bound, $l_{ij}$, to 0 and set the edge capacity to $$\frac{|V_4|}{2} - 1.$$

The flow graph circuitry 331 may identify the residual capacity of an edge, $r_{ij}$, as follows.

$$r_{ij} = \begin{cases} f_{ij} - l_{ij}, & \text{if } (i, j) \in E_4^f \\ c_{ij} - f_{ij}, & \text{if } (i, j) \in E_4^b \end{cases},$$

$$\forall (i, j) \in E_4^f \cup E_4^b$$

The flow graph circuitry 331 may identify a decreasing path in the flow graph 332 as a path from starting node s to ending node t (e.g. a s-t path) where the residual capacity of every edge is greater than 0. If a decreasing path visits or traverses a forward edge for a particular edge, then the flow graph circuitry 331 may determine that the flow on the particular forward edge can be reduced. If the decreasing path visits a particular backward edge, then the flow graph circuitry 331 may determine that the flow on the corresponding forward edge has to be increased.

In some implementations, the flow graph circuitry 331 may perform the following exemplary logic to determine minimum flow for a flow graph 332:

| Exemplary Logic 5. Decreasing Path Logic |
| --- |
| Input : $G_4 = (V_4, E_4, L, C)$ with initial flow |
| Output: minimum flow f and flows on $G_4$ |
| 1    for every edge (i,j) ∈ $E_4$ |
| 2        put (i,j) in $E_4^f$ |
| 3        put(j, i) in $E_4^b$; $l_{ji} =$; $c_{ji} = \frac{|V_4|}{2} - 1$ |
| 4    end for |
| 5    while path, p, exists from s to t using breadth-first-search such that $r_{mn} > 0$, ∀ (m,n) ∈ p} |
| 6        $r_{min} = \min\{r_{mn}, \forall (m, n) \in p\}$ |
| 7        for every edge (m, n) E p do |
| 8            if (m, n) $E_4^f$ then |
| 9                $f_{mn} -= r_{min}$ |
| 10              $f_{nm} = f_{mn}$ |
| 11           else // (m, n) ∈ $E_4^b$ |
| 12              $f_{mn} += r_{min}$ |
| 13              $f_{nm} = f_{mn}$ |
| 14           end if |
| 15        end for |
| 16    end while |
| 17    output f = $\Sigma_j f_{sj}$, $G_4$ |

The flow graph circuitry 331 may determine the minimum flow by performing the exemplary logic 5, and each reduction in flow in the flow graph 332 may be computed in $O(|E_4|)$ time since the flow graph circuitry 331 determines the path p through breadth-first search. Also, the flow graph circuitry 331 assigns an edge capacity of $$\frac{|V_4|}{2} - 1,$$

and thus the maximum flow initialized for an edge is $$\frac{|V_4|}{2} - 1.$$

Accordingly, the flow graph circuitry 331 may determine the minimum flow in $O(|V_4||E_4|)$ time, which can be generalized to $O(|V||E|)$. The overall time complexity of determining an initial and minimum flow for the flow graph 332 may be computed as the maximum of the complexity between the initialization of a feasible flow and determination of the minimum flow. Both of these complexities are $O(|V||E|)$, as explained above, and thus the flow graph circuitry 331 may initialize and determine a minimum flow for a flow graph 332 in $O(|V||E|)$ time, thus providing increased processing efficiency, reduced computation, and otherwise improving the flow determination process.

As one particular illustration, the flow graph circuitry 331 may determine the minimum flow as shown in the flow graph 332 in FIG. 9. The flow graph circuitry 331 may determine the total flow of the particular flow graph 332 shown in FIG. 9 as 3, which happens to be the lower bound for minimum flow for the flow graph 332 as well. Thus, by determining the minimum flow from flow graph 332, the flow graph circuitry 331 may effectively determine the minimum traversal of each node in the flow graph 332, thus representing the minimum number of s–t paths that traverse each node in $G_2$, the transform graph 312 and thus meet the path coverage criteria 240. Put another way, the minimum number of s–t paths that meet the path coverage criteria 240 for the $G_1$, the system model 234, is the minimum flow for $G_4$. In the continuing prime path example, the minimum number of s–t paths to cover all of the prime paths in the physical system represented by the system model 234 is the flow, f, in $G_4$.

The flow graph processing circuitry 341 may determine the test path set 110 from the flow graph 332 with a determined minimum flow. The flow graph processing circuitry 341 may determine the test path set 110 as the paths in the system model 234 corresponding to the flows in flow graph 332 with a determined minimum flow. In some implementations, the flow graph processing circuitry 341 may execute the following exemplary logic, which will be further explained in connection with FIGS. 10 and 11:

---
Exemplary Logic 6. Identifying minimum Test Paths from minimum flow
---

Input : $G_4 = (V_4, E_4, L, C)$ with flow on each edge, with minimum flow f.
Output: All s – t paths, $path_{G_1}$, on $_{G_1}$ corrresponding to the minimum flow.
Let $path_{Gx}$ be represented as $\{v_1^{Gx}, v_2^{Gx}, ... v_r^{Gx}\}$
1    Remove all backward edges of $G_4$. Merge vertices of
     the form $\{v^+, v^{++}\}$ into a vertex v. The incoming edges of $V^+$ would
     be the incoming edges of v and the outgoing edges of $v^{++}$ will be
     the outgoing edges of v. Let the resulting graph be $G_3$
2    loop i from 0 to f // there are f paths
3      remove all edges from $G_3$ which have flow of 0.
4      find path, $path_{G_3}$, from s to t using breadth first search
5      for every edge (m, n) $\in path_{G_3}$ do ---
-continued Exemplary Logic 6. Identifying minimum Test Paths from minimum flow
---

6        $f_{mn}$–= 1
7      end for
8    end loop
9    for every $path_{G_3}$ do
10      initialize $path_{G_2}$ = 0; checkForCycles = true
      while (checkForCycles) // loop till a path has no vertex
      reduced from a cycle
         checkForCycles = false
11         for every vertex $v_i^{G_3} \in path_{G_3}$ do
12           if $v_i^{G_3} = v_c^{G_3}$ where $v_c^{G_3}$ is a vertex reduced from a cycle c = $\{v_1^{G_2}, v_2^{G_2}, ... v_1^{G_2}\}$
13            checkForCycles = true
            if $v_c^{G_3}$ contains a vertex, $v_j^{G_2}$, connected to last
            vertex of $path_{G_3}$ //
14    e.g., connection information previously saved by the acyclic
     transform graph circuitry 321
15             $path_{G_2}$+= $\{v_j^{G_2}, v_{j+1}^{G_2}, ... v_j^{G_2}\}$
16           Else
17             $path_{G_2}$+= c
18           end if
19         Else
20           $path_{G_2}$+= $v_i^{G_3}$
21         end if
22       end for
23      end while
24    // ensure connectivity between vertexes in $G_2$
25    for every vertex $v_i^{G_2} \in path_{G_2}$ do
26      if $v_i^{G_2}$ is not connected to $v_{i-1}^{G_2}$ in $G_2$ by an edge
27        place path between $v_{i-1}^{G_2}$ and $v_i^{G_2}$ using breadth first search
28      end if
29    end for
30 end for // we have got paths corresponding to $G_2$
31 // reduce the paths generated to remove redundancy
32 Initialize checkAgain = true
33 while (checkAgain)
34    checkAgain = false
35    for all cycles c' in $path_{G_2}$ do
36      if number of occurrences of c' in all paths $path_{G_2} > 1$ do
37        except the first instance, replace all other instances
     of c' in all paths $path_{G_2}$ with the first vertex of c'
38        checkAgain = true
39      end if
40      let $path_{sub}$ = c' – first & last vertices of c'
41      if number of occurrences of $path_{sub}$ in all paths $path_{G_2} > 1$ do
42        replace c' in $path_{G_2}$ with the first vertex of c'
43        checkAgain = true
44      end if
45    end for //for all cycles
46 end while
47 // now we merge the vertices to get the path corresponding to $G_1$
48 for every $path^{G_2}$ do
49    initialize $path_{G_1}$ = s
50    for every vertex $v_i^{G_2} \in path_{G_2}$ do
51      $path_{G_1}$ = last node of $path_{G_1} \cup v_i^{G_2}$
52    end for
53    $path_{G_1}$ = last node of $path_{G_1} \cup t$
54    Output $path_{G_1}$
55 end for To generate the test path set 110 from the flow graph 332 with minimum flow, the flow graph processing circuitry 341 may undo or reverse previous processing of the system model 234, transform graph 312, acyclic transform graph 322, or any combination thereof. For example, the flow graph processing circuitry 341 may merge vertices (corresponding to previous splitting of vertices), replace a particular vertex with a cyclic path (corresponding to previous replacing of cyclic paths with a new vertex), and replace nodes corresponding to the transform graph 312 with paths in the system model 234 (corresponding to previous mapping of paths in the system model 234 to the nodes of the transform graph 312).

Figure 10:
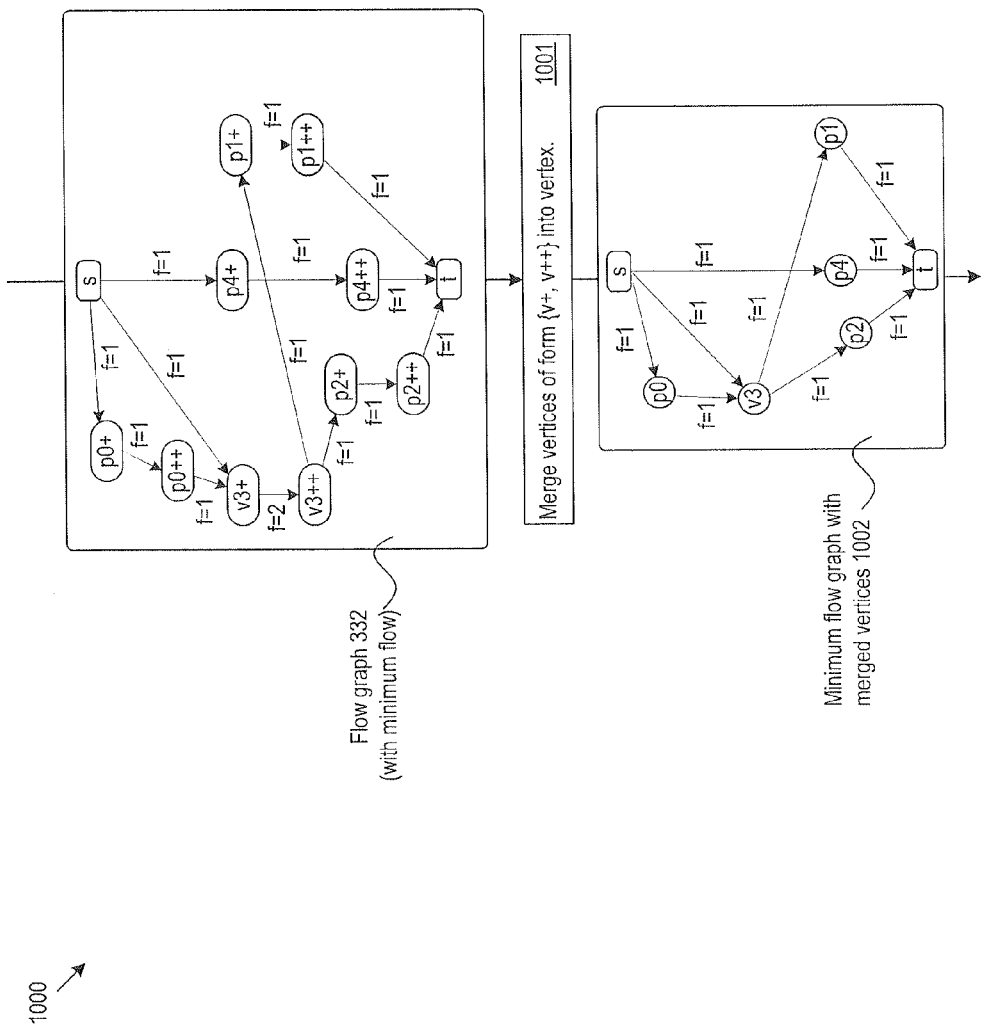
FIG. 10 shows another example of logic that flow graph circuitry may implement in hardware, software, or both.

FIG. 10 shows an example of logic 1000 the flow graph processing circuitry 341 may implement in hardware, software, or both. The flow graph processing circuitry 341 may implement the logic 1000 to merge vertices in the flow graph 332. In particular, the flow graph processing circuitry 341 may merge vertices in the form {v+, v++} into a single vertex (1001) to obtain a minimum flow graph with merged vertices 1002. As seen in FIG. 10, the minimum flow graph with merged vertices 1002 includes vertexes merged from the flow graph 332 with minimum flow. For example, the flow graph processing circuitry 341 merges vertices p0+ and p0++ into merged vertex p0, vertices v3+ and v3++ into merged vertex v3, and so on. Note the minimum flow graph with merged vertices 1002 correlates to the acyclic transform graph 322 in that they both share the same vertices and edges, and the minimum flow graph with merged vertices 1002 includes a minimum flow. In that regard, the minimum flow graph with merged vertices 1002 may be understood as the transform graph 322 with minimum flow assigned that meets the path coverage criteria 240.

Figure 11:
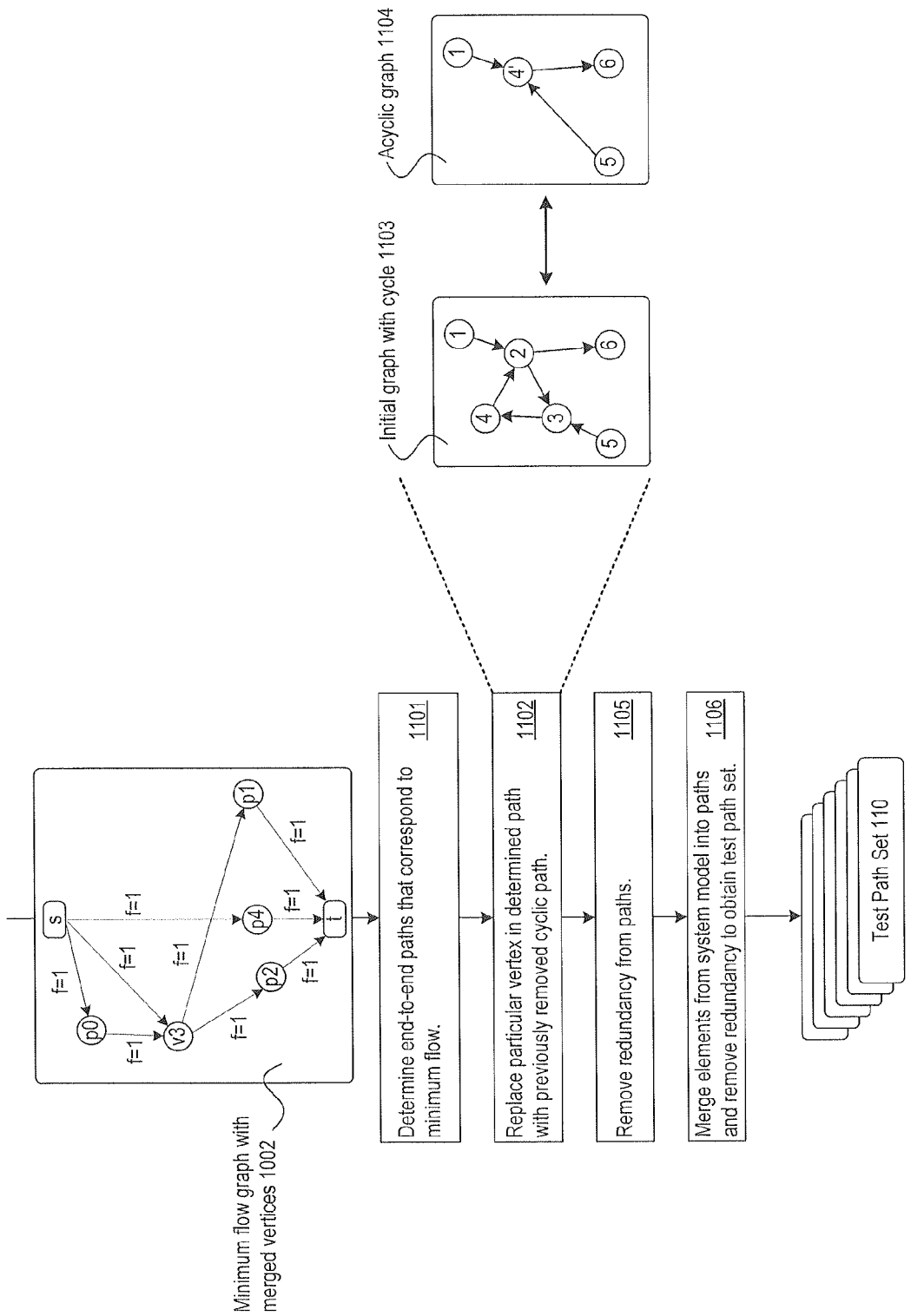
FIG. 11 shows an example of logic that flow graph processing circuitry may implement in hardware, software, or both.

The flow graph processing circuitry 341 may process the minimum flow graph with merged vertices 1002 to determine the test path set 110. FIG. 11 shows an example of logic 1100 that the flow graph processing circuitry 341 may implement in hardware, software, or both. First, the flow graph processing circuitry 341 may determine end-to-end (e.g., s–t) paths that correspond to the minimum flows for the minimum flow graph with merged vertices 1002 (1101). In doing so, the flow graph processing circuitry 341 may remove any edges that have a flow of 0. Then, the flow graph processing circuitry 341 may identify a path through breadth first search from starting node s to ending node t. The flow on the edges of this identified path are reduced by 1 by the flow graph processing circuitry 341, and the flow graph processing circuitry 341 may repeat this process until no paths can be found. In some implementations, the flow graph processing circuitry performs steps 1-8 of exemplary logic 6 above to determine these paths corresponding to the minimum flow. In the continuing prime path example and for the specific minimum flow graph with merged vertices 1002 shown in FIG. 11, the flow graph processing circuitry 341 may determine the paths corresponding to the minimum flow as $\{s, p_4, t\}$, $\{s, v_3, p_1, t\}$, and $\{s, p_0, v_3, p_2, t\}$.

Next, the flow graph processing circuitry 341 may replace a vertex in the determined path with a previously removed cyclic path (1102). In particular, the flow graph processing circuitry 341 may re-insert cyclic paths that were previously replaced by the acyclic transform graph circuitry 321. In doing so, the flow graph processing circuitry 341 may access replaced cyclic paths that correspond to the vertexes for replacement. The flow graph processing circuitry 341 may also access connection information stored by the acyclic transform graph circuitry 321, which may specify incoming edge data for nodes in the previously removed cyclic path. The path with replaced cyclic paths may be referred to as an expanded path.

As any node of a removed cyclic path can serve as the starting and ending point, the flow graph processing circuitry 341 may determine a particular starting/ending node for replacing a particular vertex based on the incoming edge to the particular vertex, the connection information, or both. For instance, the flow graph processing circuitry 341 may select a particular starting node for the cyclic path when replacing a vertex according to the previous node linking to the vertex being replaced. The flow graph processing circuitry 341 may use the connection information to determine a starting node for the cyclic path that includes an incoming edge from the previous node linking to the vertex to be replaced. Accordingly, the flow graph processing circuitry 341 may ensure connectedness for edges linking to the cyclic path replacing a vertex. In some implementations, the flow graph processing circuitry 341 performs steps 10-23 of exemplary logic 6 above to replace vertices with previously removed cyclic paths.

In the continuing example with determined paths $\{s, p_4, t\}$, $\{s, v_3, p_1, t\}$, and $\{s, p_0, v_3, p_2, t\}$, the flow graph processing circuitry 341 may determine that the first path $\{s, p_4, t\}$ does not include any vertexes that previously replaced a cyclic path and may thus determine a first expanded path as $\{s, p_4, t\}$. For the second path $\{s, v_3, p_1, t\}$, the flow graph processing circuitry 341 may identify vertex $v_3$, and replace $v_3$ with a previously removed cyclic path, for example $\{p_3, p_5, v_2, p_3\}$, to obtain the path $\{s, p_3, p_5, v_2, p_3, p_1, t\}$. Then, the flow graph processing circuitry 341 may replace vertex $v_2$ with a corresponding cyclic path to obtain the path $\{s, p_3, p_5, p_7, v_1, p_6, p_7, p_3, p_1, t\}$ and further replace vertex $v_1$ with its corresponding cyclic path to obtain the second expanded path $\{s, p_3, p_5, p_7, p_9, p_8, p_9, p_6, p_7, p_3, p_1, t\}$. For the third path, $\{s, p_0, v_3, p_2, t\}$, the flow graph processing circuitry 341 may replace vertex $v_3$ to obtain the path $\{s, p_0, v_2, p_3, p_5, v_2, p_2, t\}$, replace vertex $v_2$ to obtain the path $\{s, p_0, v_1, p_6, p_7, v_1, p_3, p_5, p_7, v_1, p_6, p_7, p_2, t\}$, and replace $v_1$ to obtain the third expanded path $\{s, p_0, p_9, p_8, p_9, p_6, p_7, p_9, p_8, p_9, p_3, p_5, p_7, p_9, p_8, p_9, p_6, p_7, p_2, t\}$.

The flow graph processing circuitry 341 may ensure the connectedness of the expanded paths with re-inserted cyclic paths. The flow graph processing circuitry 341 may determine that an end node for an inserted cyclic path does not connect to a next node in the path. For the third expanded path $\{s, p_0, p_9, p_8, p_9, p_6, p_7, p_9, p_8, p_9, p_3, p_5, p_7, p_9, p_8, p_9, p_6, p_7, p_2, t\}$, the flow graph processing circuitry 341 may identify path gaps for the sub-path $\{p_9, p_3\}$ and sub-path $\{p_7, p_2\}$ because these sub-paths are not directly connected. The flow graph processing circuitry 341 may ensure connectedness in the expanded path by inserting one or more linking paths between vertices in the expanded path.

To illustrate how the flow graph processing circuitry 341 may ensure connectedness when inserting cyclic graphs, take for example the initial graph with cycle 1103 and acyclic graph 1104 shown in FIG. 11. The flow graph processing circuitry 341 may determine a path of {5, 4', 6}. To replace vertex 4' with a previously removed cycle includes nodes 2, 3, and 4, the flow graph processing circuitry 341 may do more than simply replace vertex 4' with cyclic path {4, 2, 3, 4}, particularly as the flow graph processing circuitry 341 may determine that there is no edge (5, 4) from vertex 5 incoming to this cyclic path and there is no edge (4, 6) outgoing from the replaced cyclic path to the next node (node 6) in the path. Accordingly, and as discussed above, the flow graph processing circuitry 341 may select a starting node for the cyclic path that has an incoming edge linking the previous node in the path to the starting node of the cyclic path. In particular, the flow graph processing circuitry 341 may determine to insert the cyclic path {3, 4, 2, 3} as there exists an incoming edge from vertex 5 to vertex 3. To address the path gap from vertex 3 (ending node of the inserted cyclic path) to vertex 6 (next node following inserted cyclic path), the flow graph processing circuitry may add a linking path to ensure connectedness. In the initial graph with a cycle 1103, vertex 3 is linked to vertex 6 through the path {3, 4, 2, 6}. Accordingly, the flow graph processing circuitry 341 may insert the linking path {4, 2} and the expanded path with inserted linking paths be {5, 3, 4, 2, 3, 4, 2, 6}, e.g., a connected expanded path.

In a similar way, the flow graph processing circuitry may ensure connectedness for the third expanded path $\{s, p_0, p_9, p_8, p_9, p_6, p_7, p_9, p_8, p_9, p_3, p_5, p_7, p_9, p_8, p_9, p_6, p_7, p_2, t\}$ in the continuing example. In some implementations, the flow graph processing circuitry 341 performs steps 24-29 of the exemplary logic 6 above to ensure connectedness of expanded paths by inserting linking paths. In particular, the flow graph processing circuitry 341 may insert linking path $\{p_6, p_7\}$ to link vertices $p_9$ to $p_3$ and insert linking path $\{p9\}$ to link $p_7$ and $p_2$. Upon ensuring connectedness, the flow graph processing circuitry 341 may obtain the connected expanded paths $\{s, p_4, t\}$, $\{s, p_3, p_5, p_7, p_9, p_8, p_9, p_6, p_7, p_3, p_1, t\}$, and $\{s, p_0, p_0, p_8, p_9, p_6, p_7, p_9, p_8, p_9, p_6, p_7, p_3, p_5, p_7, p_9, p_8, p_9, p_6, p_7, p_9, p_2, t\}$, each of which may be fully connected and without any path gaps.

The flow graph processing circuitry 341 may reduce or remove redundancy in the connected expanded paths (1105). In some implementations, the flow graph processing circuitry 341 identifies and removes redundancies occurring within a particular path. In that regard, the flow graph processing circuitry 341 may identify redundancy when a particular cyclic sub-path occurs multiple times in a connected expanded path. For example, the flow graph processing circuitry 341 may determine that the cyclic sub-path $\{p_9, p_8, p_9\}$ is present three times in the third connected expanded path. The flow graph processing circuitry 341 may remove the redundancy by removing instances of the recurring cyclic sub-path, e.g., replacing all but one of the recurring cyclic sub-paths with the starting node of the recurring cyclic sub-path ($p_9$ in this case). In some implementations, the flow graph processing circuitry 341 leaves the first occurrence of the recurring cyclic sub-path intact while removing subsequent redundant occurrences by leaving only the starting node in the path. After addressing the $\{p_9, p_8, p_9\}$ sub-path redundancy, the flow graph processing circuitry 341 may obtain the path $\{s, p_0, p_9, p_8, p_9, p_6, p_7, p_9, p_6, p_7, p_3, p_5, p_7, p_9, p_6, p_7, p_9, p_2, t\}$. The flow graph processing circuitry 341 may continue to remove redundancies from paths until the path is non-redundant. In the present example, the flow graph processing circuitry 341 may determine that the cyclic sub-path $\{p_7, p_9, p_6, p_7\}$ occurs twice and replace the second instance to obtain the path $\{s, p_0, p_9, p_8, p_9, p_6, p_7, p_9, p_6, p_7, p_3, p_5, p_7, p_9, p_2, t\}$. In some implementations, the flow graph processing circuitry 341 performs steps 35-39 of the exemplary logic 6 above to remove recurring cyclic sub-paths.

The flow graph processing circuitry 341 may also remove or reduce redundancy by determining that a portion of a cyclic sub-path occurs multiple times in the path. For the path $\{s, p_0, p_9, p_8, p_9, p_6, p_7, p_9, p_6, p_7, p_3, p_5, p_7, p_9, p_2, t\}$ with removed recurring cyclic sub-paths, the flow graph processing circuitry 341 may determine that for the cycle $\{p_7, p_9, p_6, p_7\}$, the entire sub-path of the cycle aside from the starting and ending nodes (in this case, the sub-path $\{p_9, p_6\}$) occurs more than once. Accordingly, the flow graph processing circuitry 341 may further reduce redundancy by replacing the cycle $\{p_7, p_9, p_6, p_7\}$ with just the first node $p_7$ as the sub-path $\{p_9, p_6\}$ already occurs elsewhere. In removing this redundancy, the flow graph processing circuitry 341 may obtain the path $\{s, p_0, p_9, p_8, p_9, p_6, p_7, p_3, p_5, p_7, p_9, p_2, t\}$. In some implementations, the flow graph processing circuitry 341 performs steps 40-44 of the exemplary logic 6 above to remove these redundancies based on sub-paths of cycles occurring multiple times.

Additionally or alternatively, the flow graph processing circuitry 341 may reduce redundancy occurring between multiple different connected expanded paths. For instance, the flow graph processing circuitry 341 may determine that the path $\{p_9, p_8, p_9\}$ occurs both in the second and third connected expanded paths. Thus, the flow graph processing circuitry 341 may remove this redundant cyclic path, e.g., remove all occurrences but one across all of the expanded connected paths. Along similar lines, the flow graph processing circuitry 341 may identify and remove redundant sub-paths of cycles across multiple expanded connected paths as well.

The flow graph processing circuitry 341 may merge elements from the system model 234 into processed paths to determine the test path set 110 (1106). To do so, the flow graph processing circuitry 341 may replace the nodes of the processed paths (which represent prime paths in the system model 234 in the continuing example) with elements of the system model 234. To illustrate, the flow graph processing circuitry 341 may process the sub-path $\{p_9, p_8, p_9\}$, and identify the system model elements of $p_9$ as path $\{4, 5, 4\}$ of the system model 234 and the system model elements of $p_8$ as path $\{5, 4, 5\}$ of the system model 234. To remove redundancy, the flow graph processing circuitry 341 may determining overlapping vertices of the system model elements, and include this overlap only once. Therefore, the flow graph processing circuitry 341 processes the path $\{p_9, p_8, p_9\}$ to $\{4, 5, 4, 5, 4\}$ by observing that the overlap between $p_9$ and $p_8$ is $\{5, 4\}$ and the overlap between $p_8$ and $p_9$ is $\{4, 5\}$. This merge operation is represented by the operator u in exemplary logic 6 above. In some implementations, the flow graph processing circuitry 341 performs steps 47-55 of exemplary logic 6 above to merge the system model elements into the non-redundant connected expanded paths. In this way, the flow graph processing circuitry 341 may merge the elements of the system model 234, and the output may be the minimum end-to-end paths in the system model 234 that satisfy the path coverage criteria 240, e.g., the test path set 110.

As such, the flow graph processing circuitry 341 may obtain the s–t paths in system model 234 (and thus also the physical system) that satisfy the path coverage criteria 240. The test path set 110 determined by the flow graph processing circuitry 341 may be the minimum set of paths for satisfying the path coverage criteria 240, thus improving efficiency. For the continuing prime path example discussed above, the flow graph processing circuitry 341 may determine the test path set 110 (e.g., the minimum s–t paths needed to cover all ten Prime Paths) as $\{s, 1, 2, t\}$, $\{s, 1, 3, 4, 1, 3, 4, 5, 4, 5, 4, 1, 3, 4, 1, 2, t\}$, and $\{s, 1, 3, 4, 5, 4, 1, 2, t\}$.

In the continuing example above, the test generation system 102 applies path coverage criteria 240 of determining the minimum test paths to traverse each of the prime paths in the system model 234, and thus the physical system. However, the test generation system 102 may apply additional or alternative path coverage criteria 240 as well. Some examples are presented next.

As a first example, the path coverage criteria 240 may specify traversing all paths in the physical system with a length of at least 2. In this example, the processing circuitry 221 may represent an edge-pair as a path $\{v_i, v_j, v_k\}$ where $(v_i, v_j)$ and $(v_j, v_k)$ belong to the Edge Set, E. The processing circuitry 221 may determine a test path set 110 (e.g., the minimum number of Test Paths to meet this coverage criteria 24) by performing a modified version of exemplary logic 1 above to generate the set of edge-pairs $\{v_i, v_j, v_k\}$ instead of prime paths, and the processing circuitry 221 may generate a transform graph 312 with these edge-pairs as nodes instead of prime paths. Satisfaction for path coverage criteria 240 to cover paths of other lengths may be similarly determined by modifying exemplary logic 1 to determine edge-triples for paths of length 3, edge-quadruples for paths of length 4, and the like.

As a second example, the path coverage criteria 240 may specify traversing simple or complete round trips. The processing circuitry 221 may identify a round trip path as a Prime Path of type C. The path coverage criteria 240 may include a simple Round Trip coverage criterion that contains at least one type C Prime Path which begins and ends for a given vertex. A complete round trip coverage criterion may specify including all type C prime paths for the given vertex. In this example, the round trip coverage criteria focuses on a subset of the set of Prime Paths for a given system model 234. Accordingly, the processing circuitry 241 may apply a modified version of the exemplary logic 1 to determine these round trip paths in a system model 234 and map these round trip paths as nodes in the transform graph 312.

As another example of path coverage criteria 240, the processing circuitry 221 may determine a test path set 110 that covers all of the edges in the system model 234. In this example, the processing circuitry 221 may forego performing exemplary logic 1 since the set of edges is directly available as E. The processing circuitry 221 may utilize the exemplary logic 2-6 as presented above. The processing circuitry 221 may represent each edge as a vertex (e.g., exemplary Logic 2) in a transform graph, remove cycles (e.g. exemplary Logic 3), convert into a flow graph and compute the minimum flow (e.g., exemplary Logic 4 & Logic 5). From the minimum flow, the minimum number of test paths can be computed, e.g., using the exemplary Logic 6 presented above.

As yet another example of path coverage criteria 240, the processing circuitry 221 may determine a test path set 110 that covers each node in the system model 234. In this example, the processing circuitry 221 may perform exemplary logic 3-6 directly on the system model 234, as splitting the vertices of an acyclic system model and setting a flow requirement of $I_{ij}$ of 1 for each edge linking split vertices ensures node coverage.

The test generation system 102 may communicate the test path set 110 to a test recipient 104 for application of the test path set 110. In that regard, the test recipient 104 may actually test a physical system with the test path set 110, e.g., to ensure proper functionality to test various system elements or for any other purpose.

Figure 12:
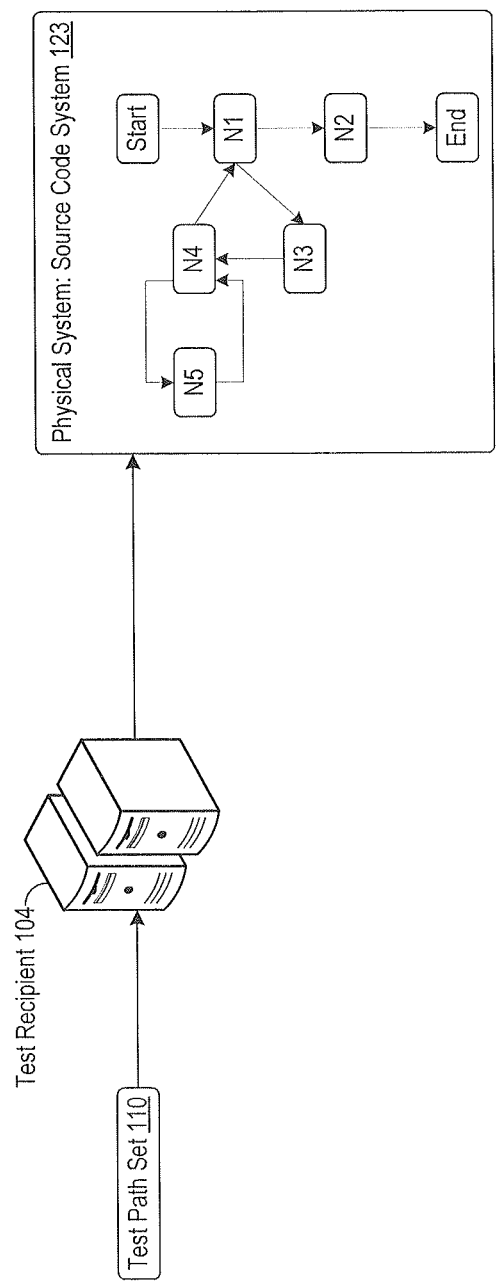
FIG. 12 shows an example of a system for applying the test path set to a source code system.
Figure 13:
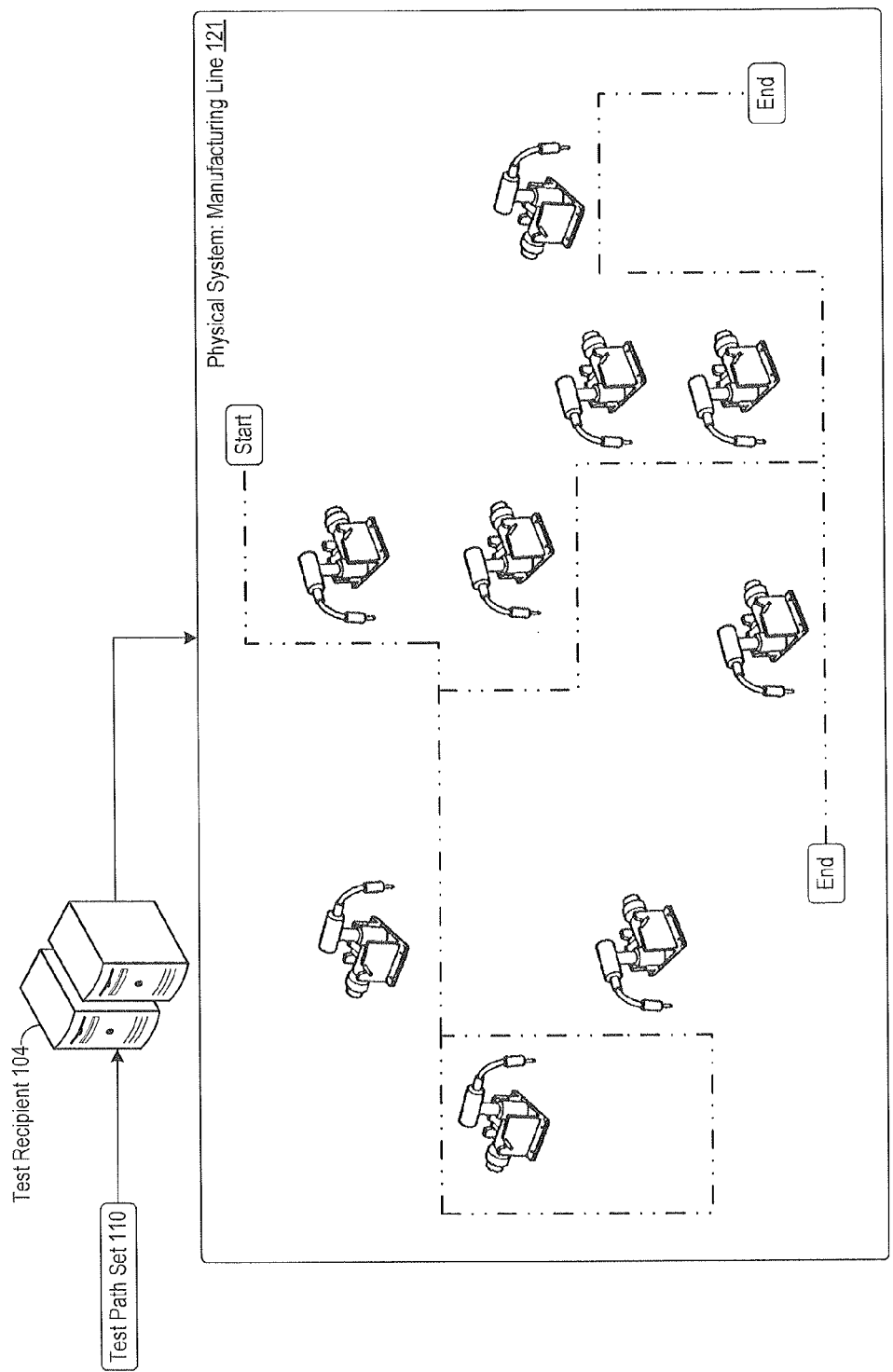
FIG. 13 shows an example of a system for applying the test path set to a physical manufacturing line.

FIG. 12 shows an example of a system 1200 for applying the test path set 110 to a source code system 123. In FIG. 12, the test recipient 104 may apply the test path set 110 to a source code system 123 to test particular code segments, applications, or other elements of the source code system 123. The source code of a source code system 123 may map to the physical system representation 202 according to logical paths in the source code, such as according to statements, loops, and branches. In this regard, the test generation system 102 may generate a test path set 110 that for execution and testing of the source code, or particular functions, methods, portions, modules or code paths thereof. Accordingly, the test path set 110 may comprehensively or efficiently test code modules, code paths, logic flows, and other elements of the source code system.

FIG. 12 shows an example of a system 1200 for applying the test path set 110 to a physical manufacturing line 121. In FIG. 12, the system 1200 includes the test recipient 104 that obtains the test path set 110. The test recipient may apply the test path set 110 to a physical system, such as a manufacturing line. In that regard, the test recipient 104 may utilize the test path set 110 to traverse particular physical processing paths in the manufacturing line. The test path set 110 may satisfy path coverage criteria 240 corresponding to testing a particular manufacturing line or sub-path, for accessing a particular manufacturing machine or element, or for covering each of the complete start-to-end physical processing paths in the manufacturing line as some examples.

While some examples of physical systems and path coverage criteria 240 have been presented, numerous other possibilities are contemplated. The test systems, circuitry, devices, and methods described above may increase efficiency in generating test paths and increase efficiency in testing complex physical systems, e.g., to ensure the desired operation of all or subsets of the physical systems.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:
1. A method comprising:
transforming a physical system representation into a system model comprising vertices and edges that represent physical processing flow from a start vertex to an end vertex through the physical system;
storing the system model in a machine-readable memory;

with processing circuitry:
retrieving the system model;
executing a system analysis on the system model to generate a test path set configured to test the physical processing within the physical system; and
through a communication interface, communicating the test path set to a test recipient for testing the physical system;
where the processing circuitry is configured to execute the system analysis by:
determining system paths through the system model;
transforming the system model into a transformed model comprising transformed flows that represent instances where system paths connect to one another;
transforming the transformed model into a flow model comprising model flows by splitting an internal node in the transformed model to separate an incoming flow and an outgoing flow to and from the internal node, where splitting the internal node in the transformed model includes:
selecting the internal node;
replacing the internal node with a first split node, a second split node, and an edge between the first split node and the second split node;
directing the incoming flow to the internal node instead to the first split node; and
making the outgoing flow from the internal node outgoing from the second split node;
selecting specific model flows within the flow model that provide a tour of each system path; and
generating the test path set from the specific model flows.

2. The method of claim 1, where the processing circuitry is further configured to:
add, to the model flows, the edge between the first and second split nodes.

3. The method of claim 2, where the processing circuitry is further configured to:
assign a flow condition to the model flows.

4. The method of claim 2, where the processing circuitry is further configured to:
assign a flow condition to the model flows that ensures that each connection between split internal nodes is chosen among the specific model flows.

5. The method of claim 1, where the processing circuitry is further configured to:
remove a cycle in the transformed model.

6. The method of claim 1, where determining system paths comprises:
recognizing a first path type in which no vertex is visited more than once other than the start vertex and end vertex; and
identifying, as a system path, a particular path of the first path type that is not a sub-path of a different path of the first path type.

7. A device comprising:
a communication interface;
transformation circuitry configured to:
transform a physical system representation into a system model comprising vertices and edges that represent physical processing flow from a start vertex to an end vertex through the physical system;
a memory configured to store the system model; and
processing circuitry configured to:
retrieve the system model;
execute a system analysis on the system model to generate a test path set configured to test the physical processing within the physical system; and
communicating the test path set through the communication interface to a test recipient for testing the physical system;
where the processing circuitry is configured to execute the system analysis by:
determining system paths through the system model;
transforming the system model into a transformed model comprising transformed flows that represent instances where system paths connect to one another;
transforming the transformed model into a flow model comprising model flows by splitting an internal node in the transformed model to separate an incoming flow and an outgoing flow to and from the internal node, where splitting the internal node in the transformed model includes:
selecting the internal node;
replacing the internal node with a first split node, a second split node, and an edge between the first split node and the second split node;
directing the incoming flow to the internal node instead to the first split node; and
making the outgoing flow from the internal node outgoing from the second split node;
selecting specific model flows within the flow model that provide a tour of each system path; and
generating the test path set from the specific model flows.

8. The device of claim 7, where the processing circuitry is further configured to:
add, to the model flows, the edge between the first and second split nodes.

9. The device of claim 8, where the processing circuitry is further configured to:
assign a flow condition to the model flows.

10. The device of claim 8, where the processing circuitry is further configured to:
assign a flow condition to the model flows that ensures that each connection between split internal nodes is chosen among the specific model flows.

11. The device of claim 7, where the processing circuitry is further configured to:
remove a cycle in the transformed model.

12. The device of claim 7, where determining system paths comprises:
recognizing a first path type in which no vertex is visited more than once other than the start vertex and end vertex; and
identifying, as a system path, a particular path of the first path type that is not a sub-path of a different path of the first path type.

13. A product comprising:
a tangible medium storing instructions, that when executed by a processor, cause the processor to:
transform a physical system representation into a system model comprising vertices and edges that represent physical processing flow from a start vertex to an end vertex through the physical system;
execute a system analysis on the system model to generate a test path set configured to test the physical processing within the physical system; and
through a communication interface, communicate the test path set to a test recipient for testing the physical system;
where the instructions cause the processor to execute the system analysis by:
determining system paths through the system model;
transforming the system model into a transformed model comprising transformed flows that represent instances where system paths connect to one another;

transforming the transformed model into a flow model comprising model flows by splitting an internal node in the transformed model to separate an incoming flow and an outgoing flow to and from the internal node, where splitting the internal node in the transformed model includes:

selecting the internal node;

replacing the internal node with a first split node, a second split node, and an edge between the first split node and the second split node;

directing the incoming flow to the internal node instead to the first split node; and making the outgoing flow from the internal node outgoing from the second split node;

selecting specific model flows within the flow model that provide a tour of each system path; and generating the test path set from the specific model flows.

14. The product of claim 13, where the instructions further cause the processor to:

add, to the model flows, the edge between the first and second split nodes.

15. The product of claim 14, where the instructions further cause the processor to:

assign a flow condition to the model flows.

16. The product of claim 14, where the instructions further cause the processor to:

assign a flow condition to the model flows that ensures that each connection between split internal nodes is chosen among the specific model flows.

17. The product of claim 13, where the instructions further cause the processor to:

remove a cycle in the transformed model.

18. A method comprising:

transforming a physical system representation into a system model comprising vertices and edges that represent physical processing flow from a start vertex to an end vertex through the physical system;

storing the system model in a machine-readable memory; with processing circuitry:

retrieving the system model;

executing a system analysis on the system model to generate a test path set configured to test the physical processing within the physical system; and through a communication interface, communicating the test path set to a test recipient for testing the physical system;

where the processing circuitry is configured to execute the system analysis by:

determining system paths through the system model;

transforming the system model into a transformed model comprising transformed flows that represent instances where system paths connect to one another;

transforming the transformed model into a flow model comprising model flows by splitting internal nodes in the transformed model to separate incoming flows and outgoing flows to and from the internal nodes, where splitting comprises, with respect to a selected internal node among the internal nodes:

adding a splitting node;

making an outgoing flow of the selected internal node an outgoing flow from the splitting node instead; and adding a splitting edge outgoing from the selected internal node and incoming to the splitting node;

selecting specific model flows within the flow model that provide a tour of each system path; and generating the test path set from the specific model flows.

19. The method of claim 18, where the processing circuitry is further configured to:

assign a lower flow bound to the splitting edge, the lower flow bound representing a minimum number of flows that traverse the splitting edge.

20. The method of claim 19 where the lower flow bound is set to a value of 1.

21. The method of claim 18 where each of the determined system paths are represented as vertices in the transformed model, and further comprising placing an edge between a first vertex and a second vertex in the transformed model when a particular system path exists, among the determined system paths, that can tour the determined system paths represented by the first and second vertices.

22. The method of claim 18 where determining system paths through the system model comprises:

determining prime paths through the system model, where the prime paths are simple paths that do not appear as a sub-path of any other simple path, and where the prime path does not have repeating vertices other than the start vertex and end vertex.

* * * * *